United States Patent
Braidwood et al.

(10) Patent No.: US 8,734,693 B2
(45) Date of Patent: May 27, 2014

(54) METHOD OF SEPARATING A POLY(ARYLENE ETHER) COMPOSITION FROM A SOLVENT, AND POLY(ARYLENE ETHER) COMPOSITION PREPARED THEREBY

(75) Inventors: Christina Louise Braidwood, Niskayuna, NY (US); Alvaro Carrillo, Delmar, NY (US); Hua Guo, Selkirk, NY (US); Gerardo Rocha-Galicia, Clifton Park, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/282,649

(22) Filed: Oct. 27, 2011

(65) Prior Publication Data

US 2012/0277399 A1 Nov. 1, 2012

Related U.S. Application Data

(62) Division of application No. 11/696,539, filed on Apr. 4, 2007, now Pat. No. 8,075,812.

(51) Int. Cl.
*B29C 47/78* (2006.01)

(52) U.S. Cl.
USPC ........ 264/102; 264/28; 264/101; 264/177.17; 264/177.19; 264/344

(58) Field of Classification Search
USPC .......... 264/28, 101, 102, 177.17, 177.19, 344
See application file for complete search history.

(56) References Cited

U.S. PATENT DOCUMENTS

| | | | |
|---|---|---|---|
| 4,154,379 A | 5/1979 | Schermutzki | |
| 4,279,579 A | 7/1981 | Froeschke | |
| 4,751,268 A | 6/1988 | Taubitz et al. | |
| 4,808,262 A | 2/1989 | Aneja et al. | |
| 5,457,169 A | 10/1995 | Weber et al. | |
| 5,502,122 A | 3/1996 | Weber et al. | |
| 5,723,525 A | 3/1998 | Elbl-Weiser | |
| 5,804,629 A | 9/1998 | Weber et al. | |
| 6,211,327 B1 | 4/2001 | Braat et al. | |
| 6,300,461 B1 | 10/2001 | Braat et al. | |
| 6,303,748 B2 | 10/2001 | Braat et al. | |
| 6,306,978 B1 | 10/2001 | Braat et al. | |
| 6,307,010 B1 | 10/2001 | Braat et al. | |
| 6,384,176 B1 | 5/2002 | Braat et al. | |
| 6,429,277 B1 | 8/2002 | Braat et al. | |

(Continued)

FOREIGN PATENT DOCUMENTS

| | | |
|---|---|---|
| EP | 0375937 A | 7/1990 |
| EP | 1012141 | 6/2000 |
| GB | 1568904 | 6/1980 |
| WO | 00/46273 A | 8/2000 |

OTHER PUBLICATIONS

EP1362871A1; Nov. 19, 2003; Abstract Only (1 page).

(Continued)

*Primary Examiner* — Timothy Kennedy
(74) *Attorney, Agent, or Firm* — Cantor Colburn LLP

(57) ABSTRACT

A method of separating a poly(arylene ether) from a solvent includes treating a poly(arylene ether)-containing solution with a devolatilizing extruder to form an extruded composition, and cooling the extruded composition with a cooling device that does not immerse the extruded composition in water. The composition may be used to isolate a poly(arylene ether) from the solvent-containing reaction mixture in which it is prepared, or to remove solvent from a multi-component poly(arylene ether)-containing thermoplastic composition.

4 Claims, 5 Drawing Sheets

(56) References Cited

U.S. PATENT DOCUMENTS

| | | |
|---|---|---|
| 6,437,085 B1 | 8/2002 | Braat et al. |
| 6,455,663 B1 | 9/2002 | Braat et al. |
| 6,469,124 B2 | 10/2002 | Braat et al. |
| 6,576,738 B2 | 6/2003 | Braat et al. |
| 6,627,704 B2 | 9/2003 | Yeager et al. |
| 6,860,966 B2 | 3/2005 | Parrillo et al. |
| 6,924,350 B2 | 8/2005 | Dong et al. |
| 7,041,780 B2 | 5/2006 | Buckley et al. |
| 7,557,179 B2 | 7/2009 | Guo et al. |
| 2003/0212207 A1 | 11/2003 | Weiss et al. |
| 2005/0046070 A1 | 3/2005 | Dong et al. |
| 2005/0049362 A1 | 3/2005 | Buckley et al. |
| 2005/0070685 A1 | 3/2005 | Mitsui et al. |
| 2006/0038324 A1 | 2/2006 | Yeager et al. |
| 2006/0041086 A1 | 2/2006 | Birsak et al. |
| 2008/0085990 A1 | 4/2008 | Richter et al. |

OTHER PUBLICATIONS

Poly(phenylene Ether) Chapter, Encyclopedia of Polymer Science and Engineering, vol. 13, John Wiley & Sons, Inc., 1988, pp. 1-31.
International Searching Authority, International Search Report, PCT/US2008/059249, Filing Date: Apr. 3, 2008; Mailing date: Aug. 25, 2008, 6 pages.
International Searching Authority, Written Opinion, PCT/US2008/059249, Filing Date: Apr. 3, 2008; Mailing date: Aug. 25, 2008, 6 pages.
Sandvik hot melt process for strips and pastilles; downloaded and printed Mar. 13, 2007; 6 pages www..smt.sandvik.com/sps.
Sandvik your partners in melt granulation systems; downloaded and printed Mar. 13, 2007; 24 pages www..smt.sandvik.com/sps.
Sandvik resin granulation systems flakes and pastilles; downloaded and printed Mar. 13, 2007; 8 pages www..smt.sandvik.com/sps.
Sandvik Rotoform® Process; downloaded and printed Mar. 13, 2007; 16 pages www..smt.sandvik.com/sps.

METHOD OF SEPARATING A POLY(ARYLENE ETHER) COMPOSITION FROM A SOLVENT, AND POLY(ARYLENE ETHER) COMPOSITION PREPARED THEREBY

CROSS REFERENCE TO RELATED APPLICATION

This application is a division of U.S. Nonprovisional patent application Ser. No. 11/696,539 filed Apr. 4, 2007, which is incorporated by reference herein in its entirety.

BACKGROUND OF THE INVENTION

Thermoset resins are materials that cure to form very hard plastics. These materials can be used in a wide variety of consumer and industrial products. For example, thermosets are used in protective coatings, adhesives, electronic laminates (such as those used in the fabrication of computer circuit boards), flooring and paving applications, glass fiber-reinforced pipes, and automotive parts (including leaf springs, pumps, and electrical components). Relative to other types of plastics, cured thermosets are typically brittle. Addition of a poly(arylene ether) to a curable thermoset composition is known to decrease the brittleness of the cured resin.

When the thermoset resin is an epoxy resin or other resin reactive with phenolic hydroxy groups, the poly(arylene ether) is typically "unfunctionalized" in the sense that it possesses one or more terminal hydroxy groups that are present in the poly(arylene ether) as synthesized by oxidative polymerization of a phenol compound. When the thermoset resin comprises reactive carbon-carbon double bonds or triple bonds (as, for example, in (meth)acrylate resins, vinyl resins, unsaturated polyesters, and the like), the poly(arylene ether) is typically functionalized with groups that can be copolymerized with the reactive carbon-carbon double bonds or triple bonds of the resin. As used herein, the prefix "(meth) acryl" means acryl- or methacryl-.

Poly(arylene ether)s are often produced by oxidative polymerization of a monohydric phenol, optionally in the presence of a polyhydric phenol, in a good solvent for the product poly(arylene ether). Various techniques of isolating poly (arylene ether)s from solution have been described. Some poly(arylene ether)s have been isolated from solution by precipitation in an antisolvent, such as methanol. However, such precipitation methods often produce poor yields of poly (arylene ether)s with low molecular weight and/or high relative concentrations of phenolic hydroxy groups. Some poly (arylene ether)s have been isolated by a so-called devolatilizing extrusion process in which heat and reduced pressure in an extruder are used to drive off solvent. See, for example, U.S. Pat. Nos. 6,211,327 B1 and 6,307,010 to Braat et al. However, some poly(arylene ether)s undergo thermal and/or oxidative degradation in these devolatilizing extrusion processes. Furthermore, when some low molecular weight poly(arylene ether)s are extruded as strands and cooled in a water bath, the strands will occasionally break, causing an inconvenient interruption in the process. In addition, devolatilizing extrusion is considered unsuitable for isolating poly (arylene ether)s functionalized with polymerizable groups, which may react under the extrusion conditions to form a crosslinked polymer.

There is therefore a need for a method of separating a poly(arylene ether) from solvent that is generally adaptable to a variety of unfunctionalized and functionalized poly(arylene ether)s of various molecular weights.

BRIEF DESCRIPTION OF THE INVENTION

The above-described and other drawbacks are alleviated by a method of separating a poly(arylene ether) from a solvent, comprising: removing volatiles from a mixture comprising a poly(arylene ether) and a solvent by devolatilizing extrusion to form an extruded composition comprising the poly(arylene ether); and cooling the extruded composition with a cooling device; wherein the cooling device cools the extruded composition without water immersion of the extruded composition.

Another embodiment is a method of isolating a poly (arylene ether), comprising: removing volatiles from mixture comprising a poly(arylene ether) and a solvent by devolatilizing extrusion to form an extruded poly(arylene ether); and cooling the extruded poly(arylene ether) with a cooling belt to form an isolated poly(arylene ether); wherein the isolated poly(arylene ether) is selected from the group consisting of a polyhydroxy poly(arylene ether) comprising, on average, at least 1.5 hydroxy groups per molecule, a polycapped poly (arylene ether) comprising, on average, at least 1.5 capping groups per molecule, and mixtures thereof; wherein the isolated poly(arylene ether) has an intrinsic viscosity of about 0.04 to about 0.15 deciliter per gram as measured in chloroform at 25° C.; wherein the mixture comprises about 65 to about 85 weight percent poly(arylene ether) and about 15 to about 35 weight percent solvent; and wherein devolatilizing extrusion comprises feeding the mixture to an extruder comprising at least one barrel having a temperature of about 200 to about 235° C., and at least one vent having a pressure of about 20 to about 40 kilopascals.

Another embodiment is a method of isolating a poly (arylene ether), comprising: removing volatiles from mixture comprising a poly(arylene ether) and a solvent by devolatilizing extrusion to form an extruded poly(arylene ether); and cooling the extruded poly(arylene ether) with a cooling belt to form an isolated poly(arylene ether); wherein the mixture comprises about 70 to about 80 weight percent poly(arylene ether) and about 20 to about 30 weight percent toluene; and wherein the isolated poly(arylene ether) has an intrinsic viscosity of about 0.04 to about 0.10 deciliter per gram as measured in chloroform at 25° C.; wherein the isolated poly (arylene ether) has, on average, at least 1.5 hydroxy groups per molecule; wherein the isolated poly(arylene ether) comprises a poly(arylene ether) having the structure

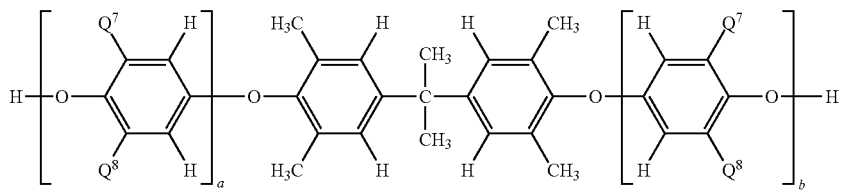

wherein each occurrence of $Q^7$ and $Q^8$ is independently methyl or di-n-butylaminomethyl; and each occurrence of a and b is independently 0 to about 12, provided that the sum of a and b is at least 1; wherein devolatilizing extrusion comprises feeding the mixture to an extruder comprising at least one barrel having a temperature of about 210 to about 230° C., and at least vent having a pressure of about 25 to about 35 kilopascals; wherein the mixture is fed to the extruder downstream of at least one vent; and wherein a portion of the isolated poly(arylene ether) is recycled for addition to the feed throat of the extruder.

Another embodiment is a method of isolating a poly (arylene ether), comprising: removing volatiles from a mixture comprising a poly(arylene ether) and a solvent by devolatilizing extrusion to form an extruded poly(arylene ether); and cooling the extruded poly(arylene ether) with a cooling belt to form an isolated poly(arylene ether); wherein the mixture comprises about 70 to about 80 weight percent poly(arylene ether) and about 20 to about 30 weight percent toluene; and wherein the isolated poly(arylene ether) has an intrinsic viscosity of about 0.04 to about 0.10 deciliter per gram as measured in chloroform at 25° C.; wherein the isolated poly (arylene ether) has, on average, at least 1.5 capping groups per molecule; wherein the isolated poly(arylene ether) comprises a poly(arylene ether) having the structure

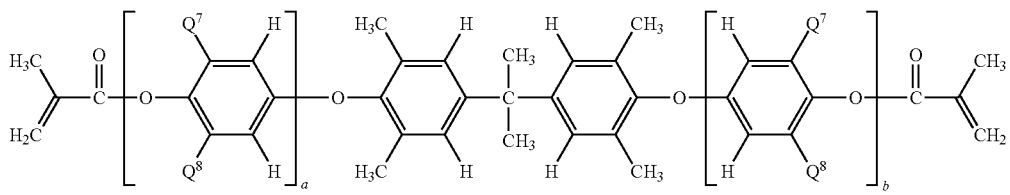

wherein each occurrence of $Q^7$ and $Q^8$ is independently methyl or di-n-butylaminomethyl; and each occurrence of a and b is independently 0 to about 12, provided that the sum of a and b is at least 1; wherein devolatilizing extrusion comprises feeding the mixture to an extruder comprising at least one barrel having a temperature of about 210 to about 230° C., and at least one vent having a pressure of about 25 to about 35 kilopascals; wherein the mixture is fed to the extruder downstream of at least one vent; and wherein a portion of the isolated poly(arylene ether) is recycled for addition to the feed throat of the extruder These embodiments and others, including poly(arylene ether)s prepared by the methods, are described in detail below.

BRIEF DESCRIPTION OF THE DRAWINGS

Referring now to the drawings wherein like elements are numbered alike in several FIGURES.

DETAILED DESCRIPTION OF THE INVENTION

The present inventors have discovered that many of the problems associated with previously known methods of separating a poly(arylene ether) from a solvent are reduced or eliminated by a method of separating a poly(arylene ether) from a solvent, comprising: removing volatiles from a mixture comprising a poly(arylene ether) and a solvent by devolatilizing extrusion to form an extruded composition comprising the poly(arylene ether); and cooling the extruded composition with a cooling device; wherein the cooling device cools the extruded composition without water immersion of the extruded composition. The low yields of precipitation processes are avoided, as are the problems of strand breakage and contamination in devolatilizing extrusion processes that utilize a water cooling bath. Surprisingly, it is has also been discovered that reactively functionalized poly(arylene ether)s tolerate the process without significant reaction of their polymerizable functionality. The result is particularly unexpected given that same reactively functionalized poly(arylene ether)s do not tolerate melt extrusion at similar temperatures.

The devolatilizing extrusion method is applicable not only to the isolation of poly(arylene ether)s from the solutions in which they are synthesized, but also to the removal of solvent from a variety of poly(arylene ether)-containing compositions.

One important feature of the devolatilizing extrusion method is cooling the extruded poly(arylene ether) with a cooling device that does not employ water immersion of the extruded composition. The cooling device is therefore distinguished from cooling devices that employ water immersion of extruded poly(arylene ether) compositions such as, for example, water baths used to cool extruded strands of poly(arylene ether) compositions.

The devolatilizing extruder used in the method can be a co-rotating twin screw extruder with a ratio of screw length to diameter (L/D) of about 10 to about 80 and comprising of a dry polymer feeding zone, at least one liquid feeding zone, at least one devolatilizing zone (for example, a vacuum vent), at least one pumping section, and a die.

Figure 3:
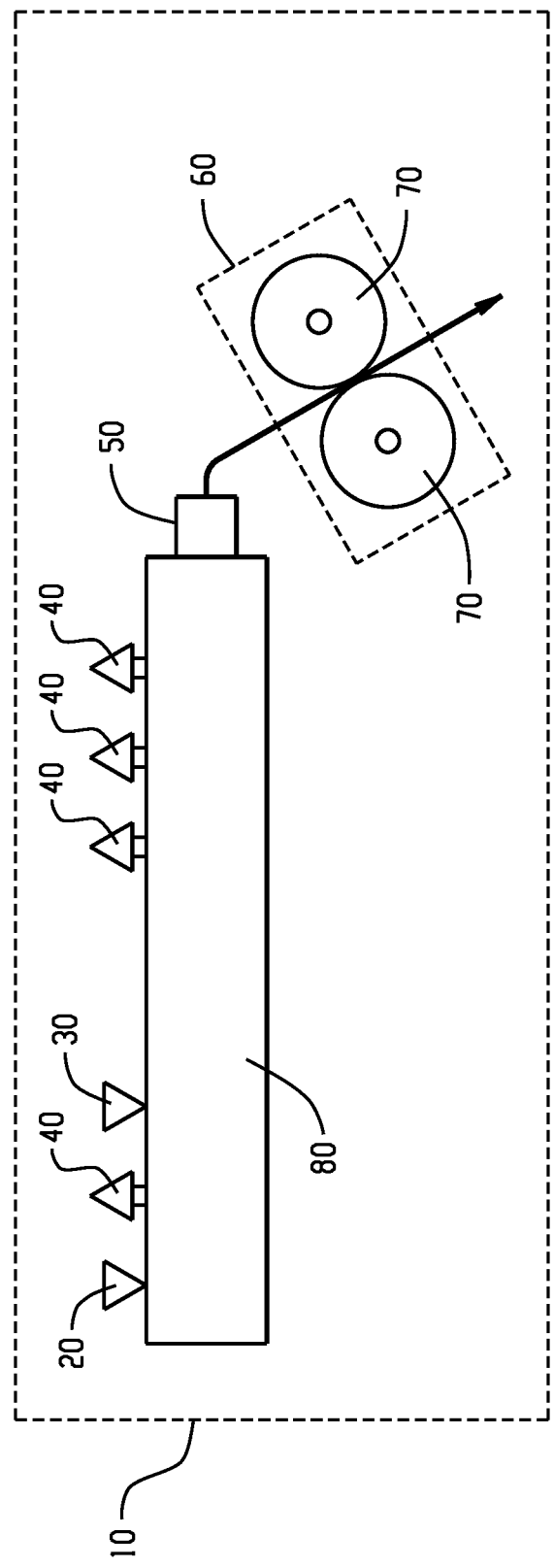
FIG. 3 is a pictorial representation of a particular devolatilizing extrusion apparatus 10 comprising an extruder barrel 80, a dry polymer addition point 20, a polymer solution addition point 30, four vents 40, a die 50, and a flaker 60 comprising two counterrotating rollers 70.
Figure 4:
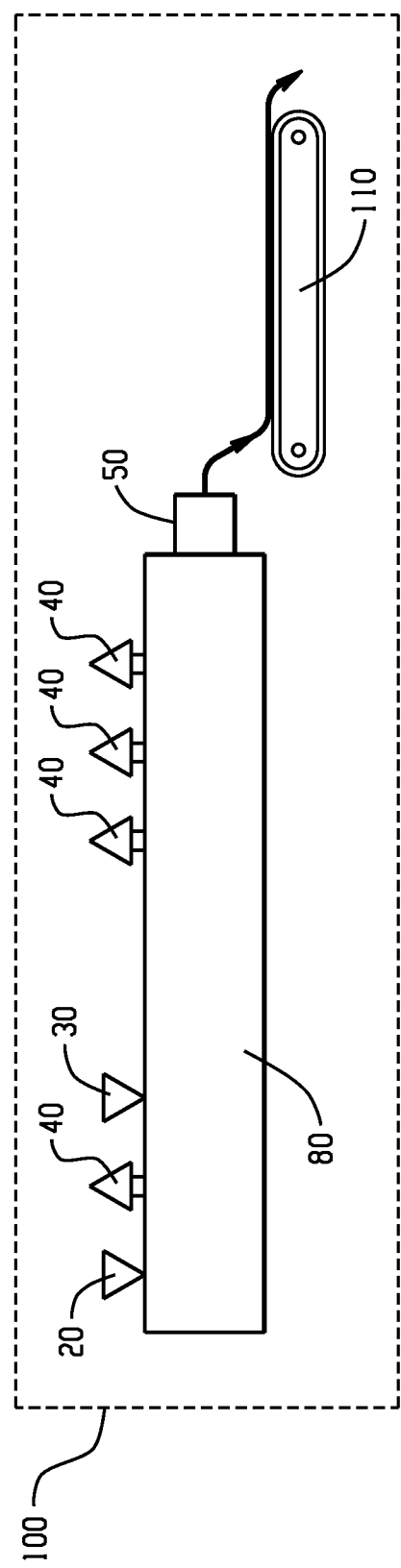
FIG. 4 is a pictorial representation of a particular devolatilizing extrusion apparatus 100 comprising an extruder barrel 80, a dry polymer addition point 20, a polymer solution addition point 30, four vents 40, a die 50, and a cooling belt 110.
Figure 5:
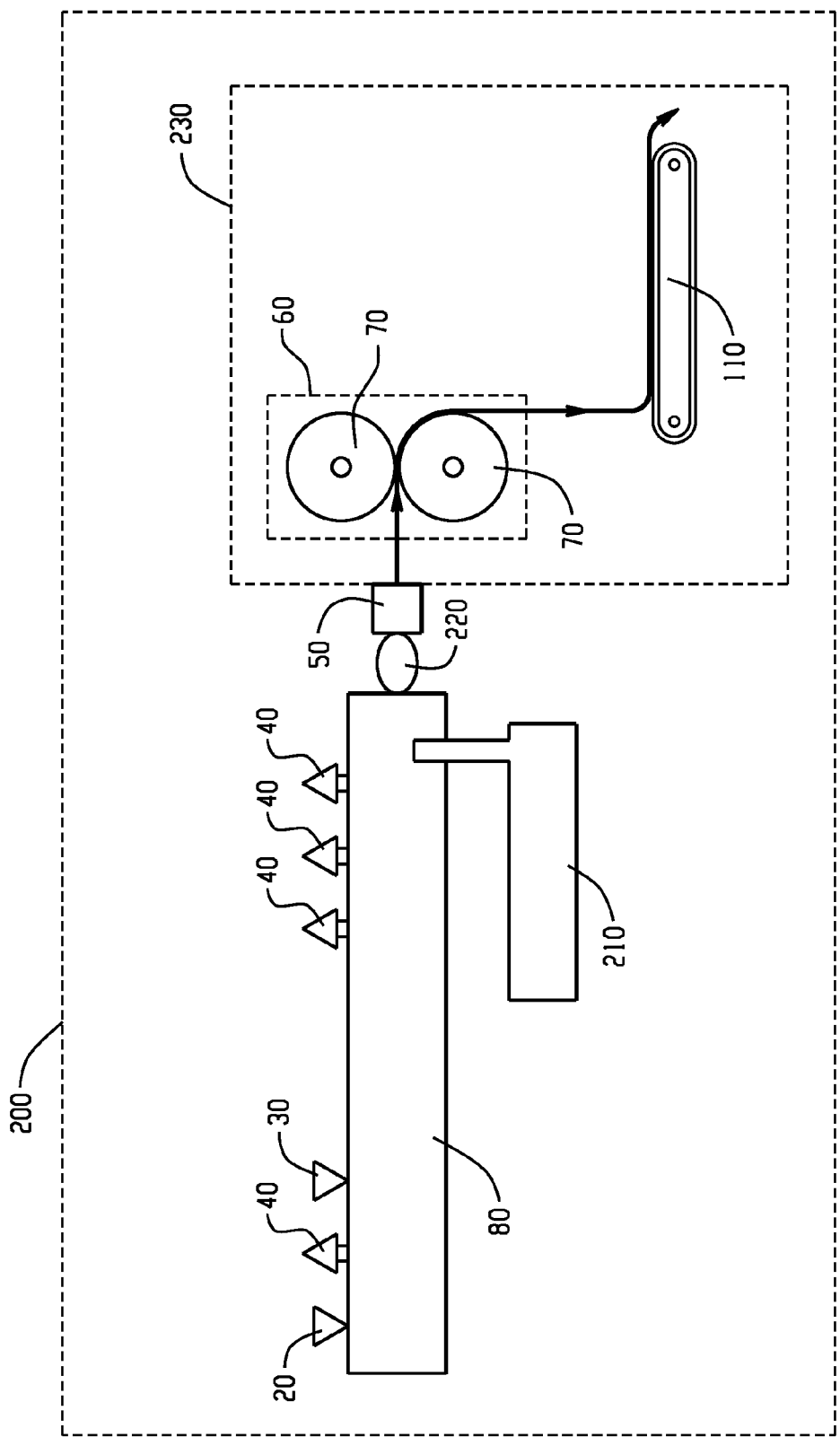
FIG. 5 is a pictorial representation of a particular devolatilizing extrusion apparatus 200 comprising an extruder barrel 80, a dry polymer addition point 20, a polymer solution addition point 30, four vents 40, an auxiliary extruder 210, a gear pump 220, a die 50, and an enclosed chamber 230 that comprises a flaker 60 comprising two counterrotating rollers 70, and a cooling belt 110.

Three particular embodiments of the devolatilizing extruder are depicted in FIGS. 3-5. In FIG. 3, the particular devolatilizing extrusion apparatus 10 comprises an extruder barrel 80, a dry polymer addition point 20, a polymer solution addition point 30, four vents 40 for removal of volatiles, a die 50 from which the devolatilized composition is extruded, and a flaker 60 comprising two counterrotating rollers 70. In this embodiment, the cooling device consists of the flaker.

In FIG. 4, the particular devolatilizing extrusion apparatus 100 comprises an extruder barrel 80, a dry polymer addition point 20, a polymer solution addition point 30, four vents 40, a die 50, and a cooling belt 110. In this embodiment, the cooling device consists of the cooling belt 110.

In FIG. 5, the particular devolatilizing extrusion apparatus 200 comprises an extruder barrel 80, a dry polymer addition point 20, a polymer solution addition point 30, four vents 40, an auxiliary extruder 210, a gear pump 220, a die 50, and an enclosed chamber 230 that comprises a flaker 60 comprising two counterrotating rollers 70, and a cooling belt 110. In this embodiment, the cooling device comprises the flaker 60 and the cooling belt 110.

Although the use of the cooling device is described here in the context of a devolatilizing extrusion process, it will be understood that the cooling device can be used in other extrusion processes for poly(arylene ether) compositions. For example, the cooling device can be used to cool extruded high-purity grades of poly(arylene ether)-containing compositions. For such high-purity grades, use of the device is advantageous because it avoids contamination of the extruded composition via exposure to impurities in a water cooling bath with recirculated water. It also minimizes water absorption by the composition.

In some embodiments, the cooling device is maintained at a temperature of about −30 to about 150° C., specifically about 0 to about 80° C., more specifically about 25 to about 50° C. It will be understood that the temperature of the cooling device may momentarily rise above the specified temperature when it contacts the extruded composition. In some embodiments, the cooling device is capable of cooling the extruded composition to a temperature of about 20° C. to the glass transition temperature of the poly(arylene ether).

In some embodiments, the cooling device comprises a cooling belt. Suitable cooling belts include the steel cooling belts commercially available from Sandvik Process Systems LLC, Totowa, N.J. Cooling belts may, optionally, be cooled with air or a liquid such as water, glycol, liquid brine, and mixture thereof. Such cooling fluids are typically circulated in a way that they contact a face of the cooling belt opposite the face contacted by the extruded composition. In other words, the cooling fluid does not typically contact the extruded composition.

In some embodiments, the cooling device comprises a means of spraying the extruded composition with a water mist.

In some embodiments, the extruded composition is extruded in the form of a sheet, a strand, or a film, and the cooling device comprises a flaker (including drum flakers and mill flakers) and a cooling belt. In some embodiments, the cooling device comprises a die face pelletizer and a cooling belt. In some embodiments, the cooling device comprises an apparatus for pastille formation and a cooling belt. Processes and apparatuses for the formation are pastilles are known in the art in include, for example, those described in U.S. Pat. Nos. 4,154,379 to Schermutzki and 4,279,579 to Froeschke.

Particularly when the poly(arylene ether) product must be free of chemical or particulate contamination, cooling the extruded composition can be conducted in a clean room. The clean room environment preferably comprises substantially dust-free, filtered air. Suitable systems to remove dust and airborne-contaminants in the clean room atmosphere include systems comprising high efficiency particulate air (HEPA) filters, dust collectors, electrostatic air filters, and the like. In one embodiment, the environment where the cooling occurs has a clean room class rating of about 100,000 or better. A clean room rating of 100,000 is equivalent to the maximum number of particles (100,000) having a size greater than or equal to 0.5 micrometer per cubic foot. A clean room rating of about 10,000 or better, may be used, with a clean room rating of about 1,000 or better preferred. The rooms or equipment where the poly(arylene ether)-containing composition is cooled may be enclosed in a positive pressure system wherein the system's air is continuously filtered to remove airborne particulates.

In some embodiments, the mixture comprising the poly(arylene ether) and the solvent is a solution.

In some embodiments, the devolatilizing extrusion comprises introducing the poly(arylene ether)-containing solution to an extruder in a superheated state. Suitable techniques for introducing the solution to an extruder in a superheated state are described in U.S. Pat. No. 6,924,350 B2 to Dong et al. By "superheated", it is meant that the solution is at a temperature greater than the boiling point of the solvent at atmospheric pressure. Typically, the temperature of the superheated polymer-solvent mixture will be about 2° to about 200° C. higher than the boiling point of the solvent at atmospheric pressure, specifically about 10 to about 150° C. higher, more specifically about 50 to about 100° C. higher. In instances where there are multiple solvents present, the polymer-solvent mixture is superheated with respect to at least one of the solvent components. Where the polymer-solvent mixture contains significant amounts of both high and low boiling solvents, it is sometimes advantageous to superheat the polymer-solvent mixture with respect to all solvents present (that is, above the boiling point at atmospheric pressure of the highest boiling solvent). Superheating of the polymer-solvent mixture may be achieved by heating the mixture under pressure.

There is no particular limitation on the physical form of the extruded composition when it encounters the cooling device. Suitable physical forms include pellets, prills, pastilles, films, strands, sheets, flakes, and the like. Methods and apparatuses for forming such physical forms are known in the art. For example, pellets may be formed by die face pelletization. As another example, pastilles may be formed by the methods described in U.S. Pat. Nos. 4,154,379 to and 4,279,579 to Schermutzki Froeschke. In some embodiments, the extruded composition is transferred to the cooling belt in the form of a film, a strand, or a sheet, and the method further comprises breaking the film, strand, or sheet into flakes or irregular particles. Suitable apparatuses for breaking a film, strand, or sheet into flakes or irregular particles are known in the art and include, for example blades and finger breakers.

The method may further comprise packaging the cooled extruded composition. Suitable packaging materials include, for example, reinforced paper bags, boxes, and fiber drums.

One advantage of the present method is that it produces a material that is not contaminated with the antisolvents typically employed for precipitation of poly(arylene ether)s. Thus, when the method is used for isolating a poly(arylene ether), the extruded composition can consist essentially of a poly(arylene ether), and the poly(arylene ether) can comprise less than 2,000 parts per million by weight of an antisolvent for the poly(arylene ether). Specifically, in some embodiments, the antisolvent content of the poly(arylene ether) is less than 1,000 parts per million by weight, more specifically less than 500 parts per million by weight, still more specifically less than 100 parts per million by weight. In this embodiment, the statement that the extruded composition can consist essentially of a poly(arylene ether) means that the extruded composition comprises at least 98 weight percent poly(arylene ether); it may contain small but measurable amounts of other components, such as solvents. Antisolvents for poly(arylene ether)s include, for example, lower alkanols having one to about ten carbon atoms (such as methanol), ketones having three to about ten carbon atoms (such as acetone and methyl ethyl ketone), and alkanes having five to about ten carbon atoms (such as hexane), and combinations thereof. The less than 2,000 parts per million limit typically refers to a single antisolvent. For example, in some embodiments the antisolvent is methanol, and the extruded poly(arylene ether) comprises less than 2,000 parts per million of methanol.

In some embodiments, the method further comprises removing volatiles from the solution prior to the removing volatiles via devolatilizing extrusion. In other words, the solution may be pre-concentrated prior to devolatilizing extrusion. For example, a poly(arylene ether) synthesis reaction mixture may contain 30 weight percent poly(arylene ether) in toluene, and this solution may be concentrated to 50 weight percent poly(arylene ether) before introduction to the devolatilizing extruder.

In some embodiments, the devolatilizing extrusion comprises adding a solid polymer to a first section of an extruder, and adding the solution to a second section of the extruder downstream of the first section. There is no particular limitation on the solid polymer added to the first section of the extruder. In some embodiments, the solution consists essentially of a solvent and a poly(arylene ether), and the solid polymer consists of the same poly(arylene ether) in solid form. For example, a portion of the extruded poly(arylene ether) produced by the process may be "recycled" for use as the solid polymer. In other embodiments, the solid polymer comprises a polymer other than a poly(arylene ether). For example, the solid polymer could be a homopolystyrene, a rubber-modified polystyrene, a polyamide, a polyester, a polycarbonate, a polyetherimide, a polyolefin, or other polymer for which useful blends with poly(arylene ether)s are known. The solid polymer is typically in pellet or powder form when it is added to the extruder. The ratio of the feed rate of the mixture to the feed rate of the solid polymer can be about 1:50 to about 50:1, specifically about 1:30 to about 30:1, still more specifically about 1:10 to about 10:1.

Independent of whether a solid polymer is added to the devolatilizing extruder, the poly(arylene ether) solution can be added to the extruder downstream of at least one vacuum vent.

In addition to being a devolatilizing extruder, the devolatilizing extrusion apparatus can be a wiped film evaporator (as described, for example, in U.S. Pat. No. 6,860,966 to Parrillo et al.) or a polymer stacked heat exchanger (as described, for example, in U.S. Pat. No. 4,808,262 to Aneja et al.).

The solution introduced to the devolatilizing extruder comprises a poly(arylene ether). Suitable poly(arylene ether)s include those comprising repeating structural units having the formula

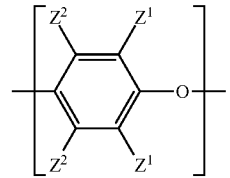

wherein for each structural unit, each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio (that is, ($C_1$-$C_{12}$ hydrocarbyl)S—), $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether). The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

In some embodiments, the poly(arylene ether) comprises, on average, at least 1.5 hydroxy groups per molecule. Such poly(arylene ether)s may be synthesized by oxidative copolymerization of a monohydric phenol and a polyhydric phenol. Suitable monohydric phenols include, for example, 2,6- dimethylphenol, 2,3,6-trimethylphenol, and the like, and mixtures thereof. Suitable polyhydric phenols include, for example, 3,3',5,5'-tetramethyl-4,4'-biphenol, 2,2-bis(3-methyl-4-hydroxyphenyl)propane, 2,2-bis(3,5-dimethyl-4-hydroxyphenyl)propane, 1,1-bis(4-hydroxyphenyl)methane, 1,1-bis(4-hydroxyphenyl)ethane, 2,2-bis(4-hydroxyphenyl)propane 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, bis(4-hydroxyphenyl)phenylmethane, 1,1-bis(4-hydroxy-3-methylphenyl)cyclohexane, 1,1-bis(4-hydroxy-3,5-dimethylphenyl)cyclopentane, 1,1-bis(4-hydroxy-3-methylphenyl)cyclohexane, 1,1-bis(4-hydroxy-3,5-dimethylphenyl)cycloheptane, 1,1-bis(4-hydroxy-3-methylphenyl)cycloheptane, 1,1-bis(4-hydroxy-3,5-dimethylphenyl)cyclooctane, 1,1-bis(4-hydroxy-3-methylphenyl)cyclooctane, 1,1-bis(4-hydroxy-3,5-dimethylphenyl)cyclononane, 11,1-bis(4-hydroxy-3,5-dimethylphenyl)cyclononane, 1,1-bis(4-hydroxy-3-methylphenyl)cyclodecane, 1,1-bis(4-hydroxy-3,5-dimethylphenyl)cyclodecane, 1,1-bis(4-hydroxy-3-methylphenyl)cycloundecane, 1,1-bis(4-hydroxy-3,5-dimethylphenyl)cycloundecane, 1,1-bis(4-hydroxy-3-methylphenyl)cyclododecane, 1,1-bis(4-hydroxy-3,5-dimethylphenyl)cyclododecane, 1,1-bis(4-hydroxy-3-t-butylphenyl)propane, 2,2-bis(4-hydroxy-2,6-dimethylphenyl)propane 2,2-bis(4-hydroxy-3-bromophenyl)propane, 1,1-bis(4-hydroxyphenyl)cyclopentane, 1,1-bis(4-hydroxyphenyl)cyclohexane, 1,1,1-tris(3,5-dimethyl-4-hydrxyphenyl)ethane 1,1,1-tris(3-methyl-4-hydroxyphenyl)ethane, 1,3,5-tris (3,5-dimethyl-4-hydroxyphenyl-1-keto)benzene, 1,3,5-tris(3,5-dimethyl-4-hydroxyphenyl-1-isopropylidene)benzene, 2,2,4,4-tetrakis(3-methyl-4-hydroxyphenyl)pentane, 2,2,4,4-tetrakis(3,5-dimethyl-4-hydroxyphenyl)pentane, 1,1,4,4-tetrakis(3-methyl-4-hydroxyphenyl)cyclohexane, 1,1,4,4-tetrakis(3,5-dimethyl-4-hydroxyphenyl)cyclohexane, 1,3,5-tris(3,5-dimethyl-4-hydroxyphenyl)benzene, 1,3,5-tris(3-methyl-4-hydroxyphenyl)benzene, 2,6-bis(2-hydroxy-5-methylbenzyl)-4-methyl phenol, 4,6-dimethyl-2,4,6-tris(4-hydroxy-3-methylphenyl)-2-heptene, 4,6-dimethyl-2,4,6-tris(4-hydroxy-3,5-dimethylphenyl)-2-heptene, 4,6-dimethyl-2,4,6-tris(4-hydroxy-3-methylphenyl)heptane, 4,6-dimethyl-2,4,6-tris(4-hydroxy-3-methylphenyl)heptane, 2,4-bis(4-hydroxy-3-methylphenylisopropyl)phenol, 2,4-bis(4-hydroxy-3,5-dimethylphenylisopropyl)phenol, tetrakis(4-hydroxy-3-methylphenyl)methane, tetrakis(4-hydroxy-3,5-dimethylphenyl)methane, tetrakis(4-[4-hydroxy-3-methylphenylisopropyl]-phenoxy)methane, tetrakis(4-[4-hydroxy-3,5-dimethylphenylisopropyl]-phenoxy)methane, and mixtures thereof. In some embodiments, the polyhydric phenol comprises 3 to 8 phenolic hydroxy groups per molecule.

In some embodiments, the poly(arylene ether) is a bifunctional poly(arylene ether) prepared by oxidative copolymerization of 2,6-dimethylphenol and 2,2-bis(3,5-dimethyl-4-hydroxyphenyl)propane. An illustrative initial reaction mixture composition for oxidative copolymerization of 2,6-dimethylphenol and 2,2-bis(3,5-dimethyl-4-hydroxyphenyl)propane is as follows: 50192 parts by weight of 2,6-dimethylphenol, 109581 parts by weight of toluene, 503 parts by weight of di-n-butylamine, 1175 parts by weight of dimethyl-n-butylamine, 264 parts by weight of a diamine mix containing N,N'-dibutylethylenediamine and didecyl dimethyl ammonium chloride, and 353 parts by weight of a catalyst mix containing 6.5 weight percent $Cu_2O$ in aqueous hydrogen bromide. The polymerization reaction is conducted by controlling the temperature and oxygen concentration in the reaction vessel. The concentration of copper in the polymerization reaction mixture is about 125 parts per million by weight based on the total weight of the reaction mixture, or about 420 parts per million by weight based on the weight of poly (arylene ether) product. The concentration of poly(arylene ether) product in the polymerization reaction mixture is 29.8 weight percent based on the total weight of the reaction mixture. The product bifunctional poly(arylene ether) has an intrinsic viscosity of 0.06 deciliter per gram measured in chloroform at 25° C.

In some embodiments, the poly(arylene ether) is a capped poly(arylene ether). A capped poly(arylene ether) is a poly (arylene ether) in which at least a portion of the terminal phenolic hydroxy groups is capped with a capping agent via an acylation or alkylation reaction, for example. Procedures for capping poly(arylene ether)s with reactive groups are known in the art. See, for example, U.S. Pat. Nos. 6,306,978 B1 to Braat et al. and 6,627,704 B2 to Yeager et al. One example of such a procedure is the reaction of the uncapped poly(arylene ether) with methacrylic anhydride in the presence of 4-(N,N-dimethylamino)pyridine as catalyst. In some embodiments, the poly(arylene ether) comprises, on average, at least 1.5 capping groups per molecule. Such capped poly (arylene ether)s may be prepared by capping poly(arylene ether)s comprising, on average, at least 1.5 phenolic hydroxy groups per molecule.

In some embodiments, the extruded composition comprises a poly(arylene ether) having the structure

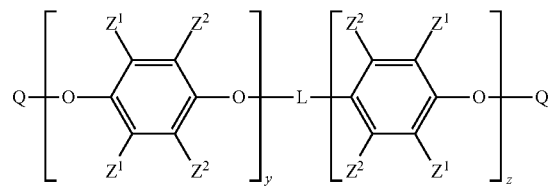

wherein L has the structure

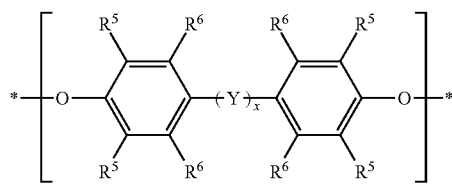

wherein each occurrence of R5 and R6 is independently selected from the group consisting of hydrogen, halogen, unsubstituted or substituted C1-C12 hydrocarbyl provided that the hydrocarbyl group is not tertiary hydrocarbyl, C1-C12 hydrocarbylthio, C1-C12 hydrocarbyloxy, and C2-C12 halohydrocarbyloxy wherein at least two carbon atoms separate the halogen and oxygen atoms; x is 0 or 1; and Y has a structure selected from the group consisting of

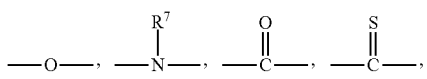

-continued

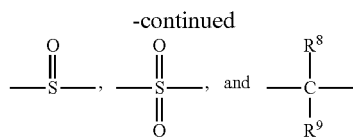

wherein each occurrence of $R_7$ is independently selected from the group consisting of hydrogen and $C_1$-$C_{12}$ hydrocarbyl, and each occurrence of $R^8$ and $R^9$ is independently selected from the group consisting of hydrogen, $C_1$-$C_{12}$ hydrocarbyl, and $C_1$-$C_6$ hydrocarbylene wherein $R^8$ and $R^9$ collectively form a $C_4$-$C_{12}$ alkylene group; each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; y and z are independently 0 to 100 provided that the sum of y and z is at least one; each occurrence of Q is independently hydrogen, (meth)acryloyl, styryl methyl

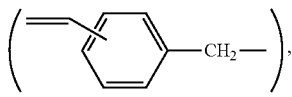

or glycidyl.

In some embodiments, the extruded composition comprises a ring-functionalized poly(arylene ether) comprising repeating structural units of the formula

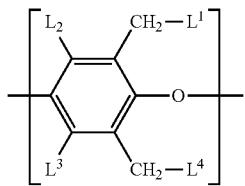

wherein each $L^1$-$L^4$ is independently hydrogen, a $C_1$-$C_{12}$ alkyl group, an alkenyl group, or an alkynyl group; wherein the alkenyl group is represented by

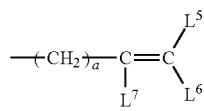

wherein $L^5$-$L^7$ are independently hydrogen or methyl, and a is 0, 1, 2, 3, or 4; wherein the alkynyl group is represented by

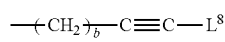

wherein $L^8$ is hydrogen, methyl, or ethyl, and b is 0, 1, 2, 3, or 4; and wherein about 0.02 mole percent to about 25 mole percent of the total $L^1$-$L^4$ substituents in the ring-functionalized poly(arylene ether) are alkenyl and/or alkynyl groups.

There is no particular limitation on the poly(arylene ether) in the extruded composition. In some embodiments, the poly(arylene ether) has an intrinsic viscosity of about 0.03 to about 1 deciliter per gram as measured in chloroform at 25° C. In embodiments in which a low intrinsic viscosity poly(arylene ether) is preferred, the poly(arylene ether) can have an intrinsic viscosity of about 0.1 to about 0.25 deciliter per gram. In embodiments in which a very low intrinsic poly(arylene ether) is preferred, the poly(arylene ether) can have an intrinsic viscosity of about 0.03 to about 0.15 deciliter per gram, specifically about 0.03 to about 0.10 deciliter per gram, more specifically about 0.06 to about 0.09 deciliter per gram.

In addition to the poly(arylene ether), the solution fed to the devolatilizing extruder comprises a solvent. Suitable solvents include, for example, halogenated aliphatic hydrocarbon solvents, aromatic hydrocarbon solvents, halogenated aromatic hydrocarbon solvents, and combinations thereof. Specific examples of halogenated aliphatic hydrocarbon solvents include trichloromethane (chloroform), tetrachloromethane (carbon tetrachloride), dichloroethanes, dichloroethylenes, trichloroethanes, trichloroethylene, tetrachloroethanes, pentachloroethane, hexachloroethane, tribromomethane, dibromomethanes, and combinations thereof. Specific examples of aromatic hydrocarbon solvents include benzene, toluene, ethylbenzene, xylenes, and combinations thereof. Specific examples of halogenated aromatic hydrocarbon solvents include chlorobenzene, dichlorobenzenes, and trichlorobenzenes, and combinations thereof. In some embodiments, the solvent is toluene.

One embodiment is a method of isolating a poly(arylene ether), comprising: removing volatiles from mixture comprising a poly(arylene ether) and a solvent by devolatilizing extrusion to form an extruded poly(arylene ether); and cooling the extruded poly(arylene ether) with a cooling belt to form an isolated poly(arylene ether); wherein the isolated poly(arylene ether) is selected from the group consisting of a polyhydroxy poly(arylene ether) comprising, on average, at least 1.5 hydroxy groups per molecule, a polycapped poly(arylene ether) comprising, on average, at least 1.5 capping groups per molecule, and mixtures thereof; wherein the isolated poly(arylene ether) has an intrinsic viscosity of about 0.04 to about 0.15 deciliter per gram as measured in chloroform at 25° C.; wherein the mixture comprises about 65 to about 85 weight percent poly(arylene ether) and about 15 to about 35 weight percent solvent; and wherein devolatilizing extrusion comprises feeding the mixture to an extruder comprising at least one barrel having a temperature of about 200 to about 235° C., and at least one vent having a pressure of about 20 to about 40 kilopascals. In some embodiments, the poly(arylene ether) solution comprises about 70 to about 80 weight percent poly(arylene ether) and about 20 to about 30 weight percent solvent. In some embodiments, the at least one vent has a pressure of about 25 to about 35 kilopascals.

In some embodiments of the method of isolating a poly(arylene ether), the devolatilizing extrusion comprises introducing the poly(arylene ether) solution to an extruder in a superheated state. In some embodiments, the isolated poly(arylene ether) comprises less than 2,000 parts per million by weight of an antisolvent for the poly(arylene ether). In some embodiments, the isolated poly(arylene ether) comprises about 0.1 to about 1 weight percent solvent, specifically about 0.2 to about 0.8 weight percent solvent, more specifically about 0.4 to about 0.6 weight percent solvent.

In some embodiments, the isolated poly(arylene ether) is a polyfunctional poly(arylene ether) comprising, on average, at least 1.5 functional groups Q per molecule; and wherein the isolated poly(arylene ether) comprises a poly(arylene ether) having the structure

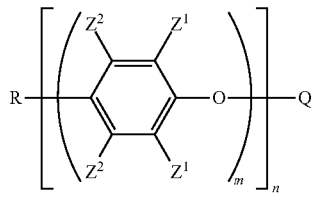

wherein R is the residue of a polyhydric phenol; each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of m is independently 0 to about 12, provided that the sum of all occurrences of m is at least 1; n, which is the number of poly(arylene ether) groups bound to R (not the number of repeating units separating R and Q), is at least 2, specifically 2 to about 10, more specifically 2 or 3 or 4, still more specifically 2; and each occurrence of Q is independently hydrogen, (meth)acryloyl, styryl methyl, or glycidyl. (Although a hydrogen atom is not ordinarily considered a functional group, it is a functional group in this embodiment because it is part of a reactive phenolic hydroxy group.)

In some embodiments, the polyhydric phenol is a dihydric phenol having the structure

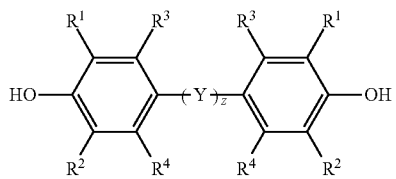

wherein each occurrence of $R^1$ and $R^2$ and $R^3$ and $R^4$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; z is 0 or 1; and Y has a structure selected from the group consisting of

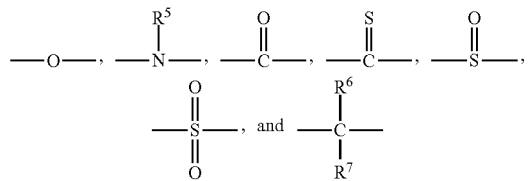

wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group. Illustrative specific dihydric phenols are included among the polyhydric phenols listed above.

In some embodiments, the isolated poly(arylene ether) has, on average, at least 1.5 hydroxy groups per molecule and comprises a poly(arylene ether) having the structure

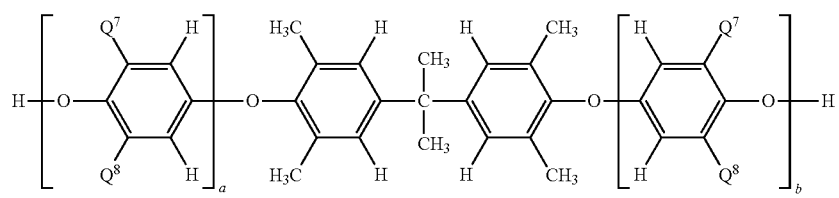

wherein each occurrence of $Q^7$ and $Q^8$ is independently methyl or di-n-butylaminomethyl; and each occurrence of a and b is independently 0 to about 12, provided that the sum of a and b is at least 1. Such poly(arylene ether)s may be prepared by copolymerization of 2,6-dimethylphenol and 2,2-bis(3,5-dimethyl-4-hydroyphenyl)propane in the presence of a catalyst comprising copper ions and di-n-butylamine.

In some embodiments, the isolated poly(arylene ether) is a polycapped poly(arylene ether) comprising, on average, at least 1.5 capping groups per molecule; wherein the isolated poly(arylene ether) comprises a poly(arylene ether) having the structure

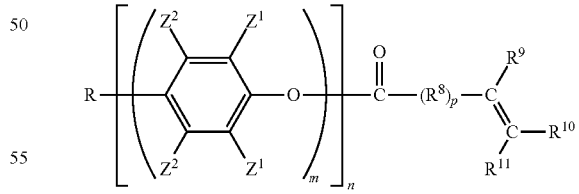

wherein R is the residue of a polyhydric phenol; each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of m is independently 0 to about 12, provided that the sum of all occurrences of m is at least 1; n, which is the number of capped poly(arylene ether) chains bound to $R_1$ is at least 2, specifically 2 to about 10, more specifically 2 or 3 or 4, still more specifically 2; each occurrence of $R^8$ is independently $C_1$-$C_{12}$ hydrocarbylene; each occurrence of p is independently 0 or 1; and each occurrence of $R^9$ and $R^{10}$ and $R^{11}$ is independently hydrogen or $C_1$-$C_{18}$ hydrocarbyl.

In some embodiments, the isolated poly(arylene ether) has, on average, at least 1.5 capping groups per molecule and comprises a poly(arylene ether) having the structure

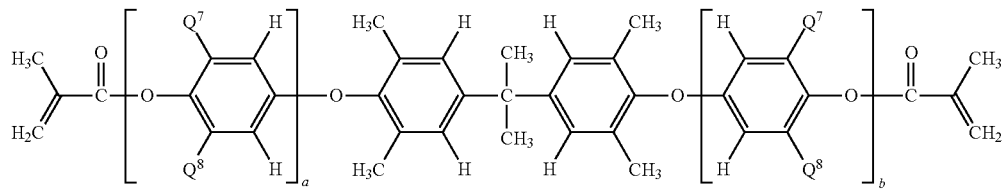

wherein each occurrence of $Q^7$ and $Q^8$ is independently methyl or di-n-butylaminomethyl; and each occurrence of a and b is independently 0 to about 12, provided that the sum of a and b is at least 1.

Any of the above-described polyfunctional poly(arylene ether)s may contain minor amounts of structural units formed as a result of side reactions occurring during poly(arylene ether) synthesis or processing. For example, when a polyfunctional poly(arylene ether) is prepared by method comprising oxidative polymerization of monomers comprising 2,6-dimethylphenol in the presence of a secondary amine, thermal decomposition may generate minor amounts of the structural units

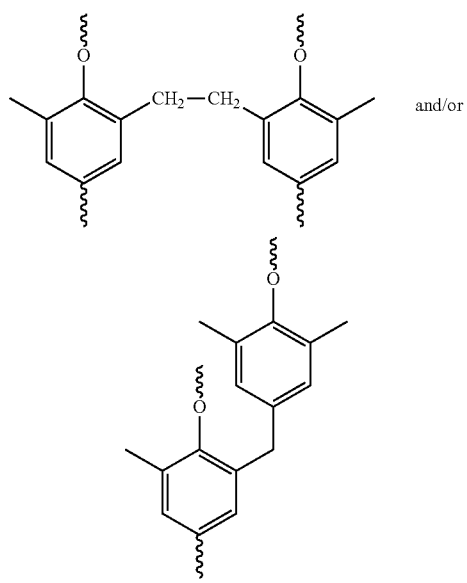

and/or wherein the wavy bonds represent connections to the remainder of the polyfunctional poly(arylene ether) molecule.

In some embodiments of the isolation method, devolatilizing extrusion comprises adding a solid poly(arylene ether) to a first section of the extruder, and adding the poly(arylene ether) solution to a second section of the extruder downstream of the first section. In some embodiments, the solid poly (arylene ether) is a portion of the isolated poly(arylene ether).

In some embodiments, the poly(arylene ether) solution is added to the extruder downstream of at least one vent having a pressure of about 20 to about 40 kilopascals, specifically about 25 to about 35 kilopascals. In some embodiments, the extruder comprises at least two vents each independently having a pressure of about 20 to about 40 kilopascals, or at least one vent each independently having a pressure of about 20 to about 40 kilopascals, or at least four vents each independently having a pressure of about 20 to about 40 kilopascals.

In some embodiments, the cooling belt is maintained at a temperature of about −30 to about 150° C., specifically about 0 to about 80° C., more specifically about 25 to about 50° C.

In some embodiments, the isolated poly(arylene ether) is in the form of flakes or irregular particles. As described above in the context of poly(arylene ether)-containing extruded compositions, flakes or irregular particles may be prepared by physically breaking up a film, strand, or sheet of extruded poly(arylene ether).

One embodiment is an isolated poly(arylene ether) prepared by one of the above-described methods and comprising less than or equal to 100 parts per million by weight of an antisolvent for the isolated poly(arylene ether). In some embodiments, the isolated poly(arylene ether) comprises about 0.1 to about 1 weight percent solvent.

One embodiment is a method of isolating a poly(arylene ether), comprising: removing volatiles from mixture comprising a poly(arylene ether) and a solvent by devolatilizing extrusion to form an extruded poly(arylene ether); and cooling the extruded poly(arylene ether) with a cooling belt to form an isolated poly(arylene ether); wherein the mixture comprises about 70 to about 80 weight percent poly(arylene ether) and about 20 to about 30 weight percent toluene; and wherein the isolated poly(arylene ether) has an intrinsic viscosity of about 0.04 to about 0.10 deciliter per gram as measured in chloroform at 25° C.; wherein the isolated poly (arylene ether) has, on average, at least 1.5 hydroxy groups per molecule; wherein the isolated poly(arylene ether) comprises a poly(arylene ether) having the structure

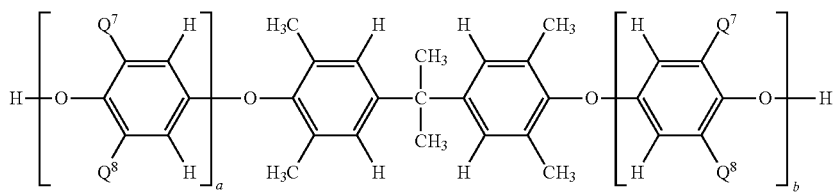

wherein each occurrence of $Q^7$ and $Q^8$ is independently methyl or di-n-butylaminomethyl; and each occurrence of a and b is independently 0 to about 12, provided that the sum of a and b is at least 1; wherein devolatilizing extrusion comprises feeding the mixture to an extruder comprising at least one barrel having a temperature of about 210 to about 230° C., and at least vent having a pressure of about 25 to about 35 kilopascals; wherein the mixture is fed to the extruder downstream of at least one vent; and wherein a portion of the isolated poly(arylene ether) is recycled for addition to the feed throat of the extruder.

Another embodiment is a poly(arylene ether) isolated by the above method and comprising less than or equal to 100 parts per million by weight of an antisolvent for the isolated poly(arylene ether). In some embodiments, the isolated poly (arylene ether) comprises about 0.1 to about 1 weight percent toluene.

One embodiment is a method of isolating a poly(arylene ether), comprising: removing volatiles from a mixture comprising a poly(arylene ether) and a solvent by devolatilizing extrusion to form an extruded poly(arylene ether); and cooling the extruded poly(arylene ether) with a cooling belt to form an isolated poly(arylene ether); wherein the mixture comprises about 70 to about 80 weight percent poly(arylene ether) and about 20 to about 30 weight percent toluene; and wherein the isolated poly(arylene ether) has an intrinsic viscosity of about 0.04 to about 0.10 deciliter per gram as measured in chloroform at 25° C.; wherein the isolated poly (arylene ether) has, on average, at least 1.5 capping groups per molecule; wherein the isolated poly(arylene ether) comprises a poly(arylene ether) having the structure the isolated poly(arylene ether). In some embodiments, the isolated poly(arylene ether) comprises about 0.1 to about 1 weight percent toluene.

The invention is further illustrated by the following non-limiting examples.

PREPARATIVE EXAMPLES 1-6

A copolymer of 2,6-dimethylphenol (2,6-xylenol; 2,6-X) and 2,2-bis(3,5-dimethyl-4-hydroxyphenyl)propane (tetramethylbisphenol A; TMBPA) was prepared in six separate batches by oxidative copolymerization in toluene in the presence of a copper amine catalyst. The monomer mixture consisted of 83 weight percent 2,6-dimethylphenol and 17 weight percent 2,2-bis(3,5-dimethyl-4-hydroxyphenyl)propane. The catalyst copper and other water soluble components were extracted with an aqueous trisodium nitrilotriacetate solution to yield a poly(arylene ether) solution comprising about 30 weight percent copolymer and about 70 weight percent toluene. Table 1 provides characterization of the poly(arylene ether) formed in each batch, both before and after catalyst chelation. In Table 1, "% TMBPA-Target" refers to the target weight percent of 2,2-bis(3,5-dimethyl-4-hydroxyphenyl) propane based on the total weight of monomer; "IV" refers to intrinsic viscosity measured at 25° C. in chloroform; "Resid. 2,6-X" refers to residual 2,6-dimethylphenol; "Resid. TMBPA" refers to residual 2,2-bis(3,5-dimethyl-4-hydroxyphenyl)propane as determined by gas chromatography; "Wt % Biphenyl unit" refers to the weight percent of 3,3',5,5'-

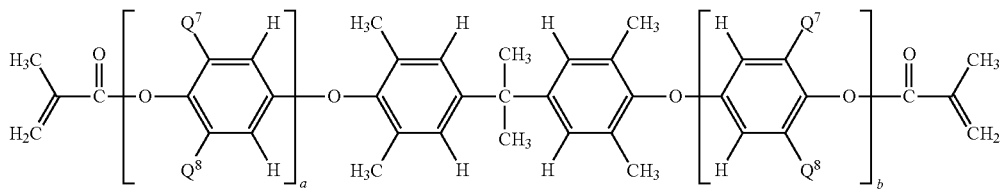

wherein each occurrence of $Q^7$ and $Q^8$ is independently methyl or di-n-butylaminomethyl; and each occurrence of a and b is independently 0 to about 12, provided that the sum of a and b is at least 1; wherein devolatilizing extrusion comprises feeding the mixture to an extruder comprising at least one barrel having a temperature of about 210 to about 230° C., and at least one vent having a pressure of about 25 to about 35 kilopascals; wherein the mixture is fed to the extruder downstream of at least one vent; and wherein a portion of the isolated poly(arylene ether) is recycled for addition to the feed throat of the extruder Another embodiment is an isolated poly(arylene ether) prepared by the above method and comprising less than or equal to 2,000 parts per million by weight of an antisolvent for tetramethyl-4,4'-dioxobiphenyl incorporated into the copolymer; "Wt % total TMBPA" refers to the weight percent total of 2,2-bis(3,5-dimethyl-4-oxyphenyl)propane units including free and incorporated into the copolymer; "Wt % Free TMBPA" refers to the weight percent of free 2,2-bis(3,5-dimethyl-4-hydroxyphenyl)propane as determined by $^1$H NMR; "Wt % Ex Mannich DBA" refers to the weight percent of 3-methyl-4-hydroxy-5-di-n-butylaminomethylphenyl groups incorporated into the copolymer; "Functionality" refers to the number of hydroxy groups per molecule, on average; "ppm OH" refers to the parts per million by weight of hydroxy groups, based on the total weight of copolymer; and "% Terminal TMBPA" refers to the percent of total TMBPA that is either free (residual) TMBPA or TMBPA incorporated at the terminus of a copolymer chain.

TABLE 1

| Sample Point | Analysis | Notes | Units | P. Ex. 1 | P. Ex. 2 | P. Ex. 3 | P. Ex. 4 | P. Ex. 5 | P. Ex. 6 |
|---|---|---|---|---|---|---|---|---|---|
| | % TMBPA - Target | | | 17.0% | 17.0% | 17.0% | 17.0% | 17.0% | 17.0% |
| Reactor | IV | | dl/g | 0.077 | 0.075 | 0.076 | 0.0798 | 0.0795 | 0.082 |
| | % Solids | | % | 31.2 | 29.5 | 29.2 | 29.75 | 30.4 | 29.4 |
| Chelation Tank | Copper | AA | ppm | 2.2 | 1.5 | 1.4 | 0.7 | 0.3 | 2 |
| | Copper | AA | ppm | | 1.9 | | | | |
| After Decantation | IV | | dl/g | 0.0803 | 0.0718 | 0.0734 | 0.083 | 0.0842 | 0.0843 |
| | % solids | Light phase after decantation | % | 27.5 | 30.2 | 32.5 | 33.2 | 33.8 | 32.7 |
| | Resid. 2,6-X | GC | ppm | 163 | 234 | 229 | 375 | 364 | 387 |
| | Resid. TMBPA | GC | ppm | 8364 | 15669 | 17838 | 16225 | 15397 | 16236 |
| | $^1$H NMR | Absolute $M_n$ | AMU | 1670 | 1546 | 1499 | 1511 | 1486 | 1512 |
| | | Wt % Biphenyl unit | % | 0.94 | 0.67 | 0.59 | 0.66 | 0.68 | 0.69 |
| | | Wt % total TMBPA | % | 21.84 | 21.51 | 21.4 | 20.66 | 20.25 | 20.26 |
| | | Wt % Free TMBPA | % | 0.92 | 1.11 | 1.21 | 1.07 | 1.07 | 1.01 |
| | | Wt % Ex Mannich DBA | % | 0.39 | 1.41 | 1.73 | 1.77 | 1.72 | 1.78 |
| | | Functionality | | 1.73 | 1.85 | 1.93 | 1.89 | 1.83 | 1.85 |
| | | ppm OH | ppm | 18800 | 22400 | 24100 | 23400 | 23100 | 22900 |
| | | % Terminal TMBPA | % | 37 | 45 | 50 | 47 | 45 | 47 |

EXAMPLES 1-12

These examples illustrate various process conditions for direct isolation of a bifunctional, uncapped low molecular weight poly(arylene ether).

The extruder was a Werner & Pfleiderer 30 millimeter co-rotating twin screw extruder with an L/D ratio of 38, a total of 12 barrels, and a drive motor power of 11 kilowatts. The dry polymer was fed with a K-Tron loss and weight feeder (model K2LT20) in barrel #1 (upstream end of extruder), the polymer solution feed section was in barrel #5, the devolatilizing sections were in barrels, 3-4, 7-8. 10 and 11; the pumping section was in barrel 12. The die head contained two orifices with 4 millimeter openings to make strands. The extruder had 5 heating zones: Zone 1 controlling barrel 2, zone 2 controlling barrels 3-5, zone 3 controlling barrels 6-9, zone 4 controlling barrels 10-12, and zone 5 controlling the die temperature. The extruder has an adjustable screw rotation rate (0-500 rpm) and a torque limiting safety device. Vacuum to the extruder was provided with a Busch Huckepack vacuum pump (Model HO0433).

The cooling belt was a Sandvik single-belt cooling conveyor. The belt had a width of 30.5 centimeters (12 inches) and a total (loop) length of 4.1 meters (167 inches) that included an actively cooled length of 95.3 centimeters (37.5 inches). So, extruded poly(arylene ether) traveled a distance of about 1.6 meters (62 inches) on the cooling belt. Cooling was provided by a water spray beneath the belt. The cooling water was circulated at a rate of about 11-15 liters per minute (about 3-4 gallons per minute) and a pressure of about 140-170 kilopascals (about 20-25 pounds per square inch gauge). The speed range for the belt is about 0.5 to 20 meters/minute. The belt transport rate in these experiments was about 10 meters per minute (33 feet per minute). The cooling belt was maintained at about 25-30° C. At the end of the cooling belt, the cooled poly(arylene ether), which was in the form of broken strand fragments of variable length, was transferred to a bag. Although the poly(arylene ether) here was in the form of broken strand fragments, it could also have been formed into prills or pellets or pastilles by use of apparatuses and methods known in the art.

The six batches of copolymer corresponding to Preparative Examples 1-6 were combined to form a single poly(arylene ether) solution that was used to test various isolation conditions. Examples 1-5 correspond to conditions tested on the first day of experimentation, and Examples 6-12 corresponding to conditions tested on the second day.

Conditions for Examples 1-5 are summarized in Table 2. Before devolatilizing extrusion, the poly(arylene ether) solution was concentrated to 79.5% solids. Solid polymer was added to the feed throat. The weight ratio of solid polymer to poly(arylene ether) solution was 1:22. For each of Examples 1-5, it was possible to dry the resin to a low content of residual solvent in one pass through the extruder. At the end of this day, however, there was partial plugging of the vent lines from the extruder, indicating that the temperature profile and vacuum settings were near their limit for stable operation.

Conditions for Examples 6-12 are summarized in Table 3. Before devolatilizing extrusion, the poly(arylene ether) solution was concentrated to 69.5% solids. For each of Examples 6-12, the resin was dried to a low content of residual solvent, but the stability of the process over an extended period of time (6 hours) was improved by decreasing the extruder zone temperatures and lowering the vacuum setting in the extruder vent ports. The tradeoff was a higher content of residual toluene.

The characteristics of the poly(arylene ether)s for the resulting samples were then compared to those for the poly (arylene ether) prior to devolatilizing extrusion. The results, presented in Table 4, show that the characteristics of the poly(arylene ether) were largely unchanged by the devolatilizing extrusion process. This result was unexpected because one skilled in the art would have expected oxidative degradation of the poly(arylene ether) in the absence of post extrusion cooling via immersion in a water bath. Number average molecular weight, weight average molecular weight, and dispersity (D, $M_w/M_n$) were determined by gel permeation chromatography (GPC) using the following conditions: the solvent was chloroform containing 67 microliters di-n-butylamine per liter; the flow rate was 1 milliliter per minute; the temperature was 40° C.; the total run time was 38 minutes; detection was at 280 nanometers; the three columns employed, upstream to downstream, were a 300 millimeter long Hewlett Packard PLgel 5 micron $10^3$ Angstrom column, a 300 millimeter long Phenomenex Phenogel 5 micron 500 Angstrom column, and a Perkin Elmer PLgel 5 micron 100 Angstrom column; software for instrument control and data collection was Chemstation Rev. A.10.01 [1635] Agilent Technologies; software for molecular weight analysis was Agilent GPC Data Analysis software for Agilent Chemstation Rev.A.02.02.

Figure 1:
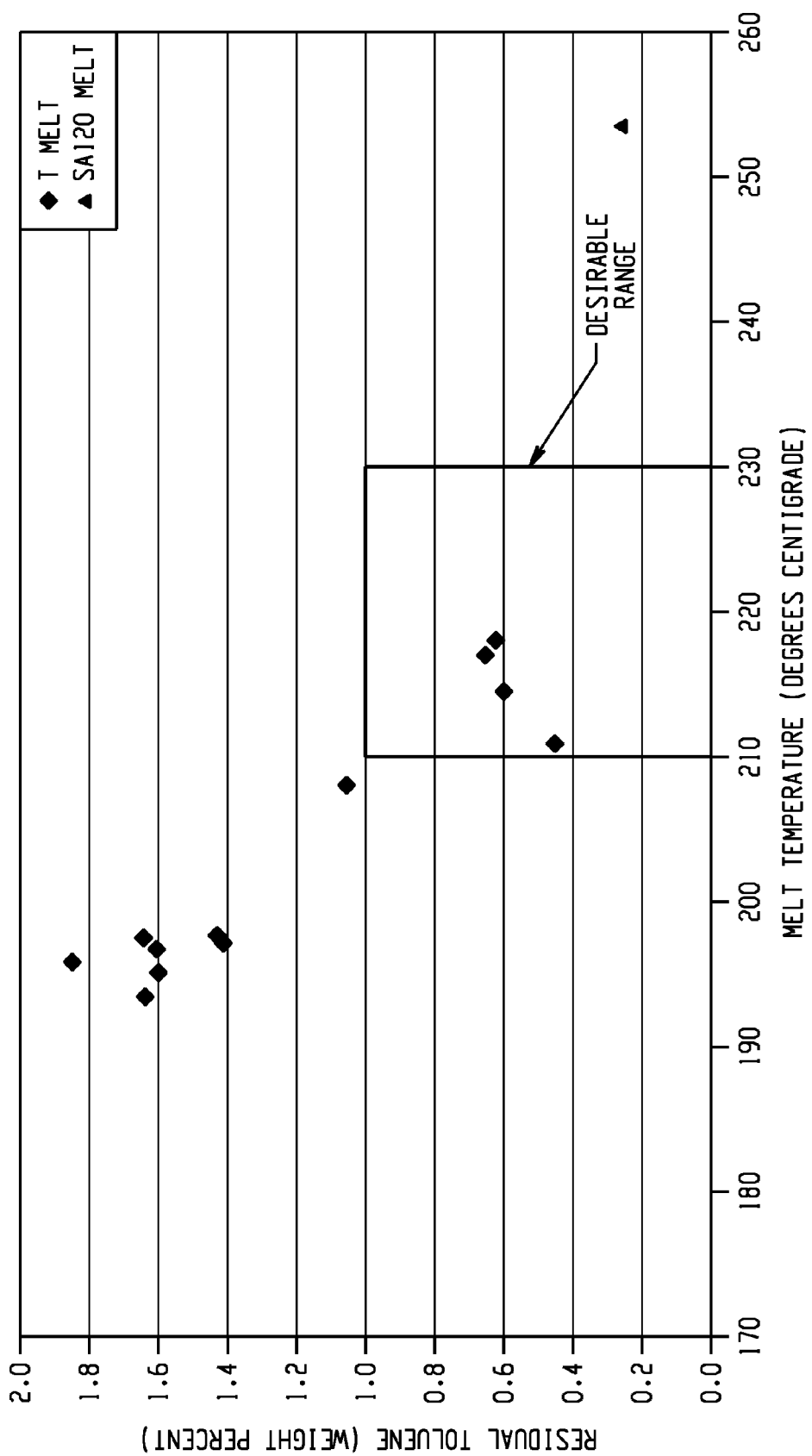
FIG. 1 is a plot of residual toluene concentration as a function of melt temperature for devolatilizing extrusion of a particular poly(arylene ether)

FIG. 1 is a plot of residual toluene as a function of extruder melt temperature. Below a melt temperature of about 210° C., the level of residual toluene rises substantially above 1 weight percent. Above a melt temperature of about 230° C., the process was less stable because of plugging of vent lines.

Figure 2:
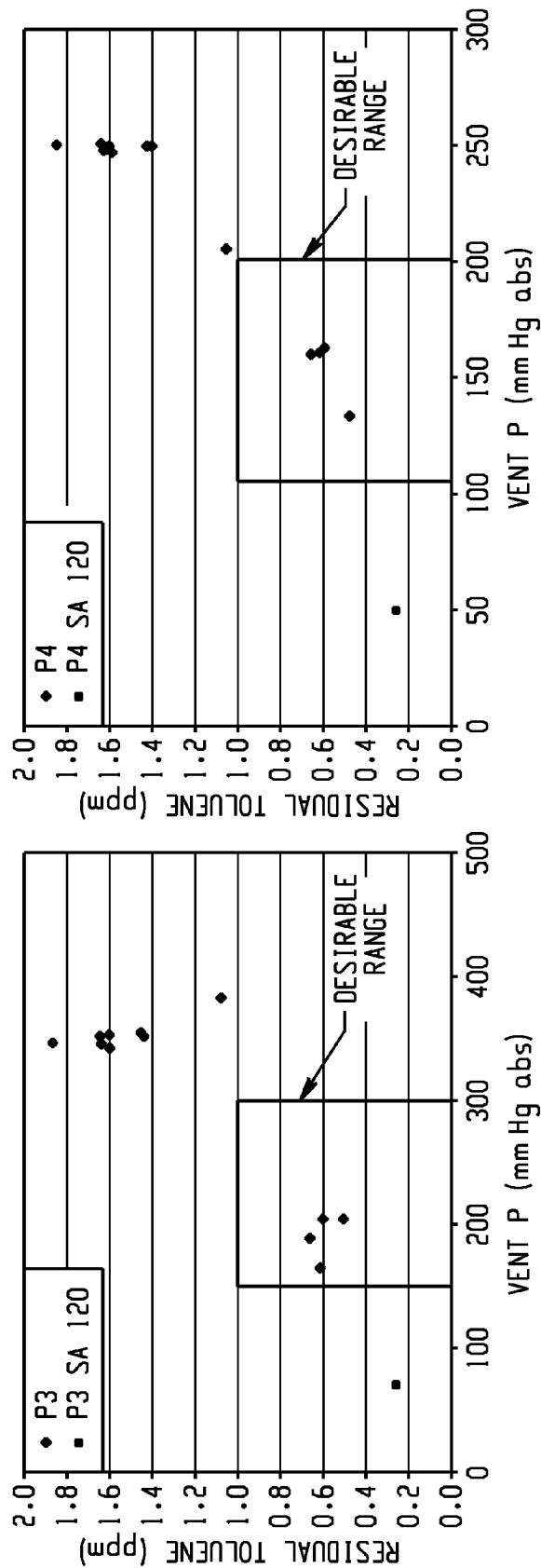
FIG. 2 consists of two plots, each plot showing residual toluene concentration as a function of the pressure maintained at a particular extruder vent; "P3" is the pressure of the third vent (counting from upstream to downstream) for a devolatilizing extrusion process isolating a 0.08 deciliter per gram poly(arylene ether) that is a copolymer of 2,6-dimethylphenol and 2,2-bis(3,5-dimethyl-4-hydroxyphenyl)propane; "P3 SA120" is the pressure of the third vent for a devolatilizing extrusion process isolating a 0.12 deciliter per gram poly(arylene ether) that is a homopolymer of 2,6-dimethylphenol.

FIG. 2 consists of plots of residual toluene as a function of vent port 3 pressure (left half of figure) and vent port 4 pressure (right half of figure). In the FIG. 2 legend, "P3" is the pressure of the third vent (counting from upstream to downstream) for a devolatilizing extrusion process isolating a 0.08 deciliter per gram poly(arylene ether) that is a copolymer of 2,6-dimethylphenol and 2,2-bis(3,5-dimethyl-4-hydroxyphenyl)propane; "P3 SA120" is the pressure of the third vent for a devolatilizing extrusion process isolating a 0.12 deciliter per gram poly(arylene ether) that is a homopolymer of 2,6-dimethylphenol. When the absolute pressure of vent port 3 is greater than about 40 kilopascals (300 millimeters of mercury) or the absolute pressure of vent port 4 is greater than about 26.7 kilopascals (200 millimeters of mercury), the level of residual toluene rises substantially above 1 weight percent. When the absolute pressure of vent port 3 is less than about 20 kilopascals (150 millimeters of mercury) or the absolute pressure of vent port 4 is less than about 13.3 kilopascals (100 millimeters of mercury), the process becomes less stable because of plugging of vent lines.

TABLE 2

| Variable | Unit | Ex. 1 | Ex. 2 | Ex. 3 | Ex. 4 | Ex. 5 |
|---|---|---|---|---|---|---|
| Toluene-PPE solution % solids | % | 79.5 | 79.5 | 79.5 | 79.5 | 79.5 |
| Toluene-PPE solution feed rate | kg/hr | 11.4 | 11.4 | 11.4 | 11.4 | 11.4 |
| Dry back feed rate | kg/hr | 0.5 | 0.5 | 0.5 | 0.5 | 0.5 |
| Screw speed | rpm | 400 | 300 | 300 | 400 | 400 |
| Temperature Zone 1 | deg C. | 199 | 199 | 191 | 191 | 188 |
| Temperature Zone 2 | deg C. | 199 | 199 | 191 | 191 | 188 |
| Temperature Zone 3 | deg C. | 199 | 199 | 191 | 191 | 188 |
| Temperature Zone 4 | deg C. | 199 | 199 | 199 | 199 | 188 |
| Temperature Die | deg C. | 218 | 218 | 204 | 204 | 199 |
| Melt temperature | deg C. | 218 | 217 | 214 | 211 | 208 |
| Pressure Vent 1 | kPa | 56.3 | 62.5 | 69.3 | 67.2 | 80.3 |
| Pressure Vent 2 | kPa | 51.9 | 59.6 | 67.7 | 65.7 | 79.3 |
| Pressure Vent 3 | kPa | 21.9 | 25.2 | 27.1 | 27.2 | 50.9 |
| Pressure Vent 4 | kPa | 21.3 | 21.3 | 21.7 | 17.9 | 27.3 |
| Residual Toluene | wt % | 0.62 | 0.66 | 0.59 | 0.47 | 1.07 |

TABLE 3

| Variable | Unit | Ex. 6 | Ex. 7 | Ex. 8 | Ex. 9 | Ex. 10 | Ex. 11 | Ex. 12 |
|---|---|---|---|---|---|---|---|---|
| Toluene-PPE solution % solids | % | 69.5 | 69.5 | 69.5 | 69.5 | 69.5 | 69.5 | 69.5 |
| Toluene-PPE solution feed rate | kg/hr | 13.6 | 13.6 | 13.6 | 13.6 | 13.6 | 13.6 | 13.6 |
| Dry back feed rate | kg/hr | 0.9 | 0.9 | 0.9 | 0.9 | 0.9 | 0.9 | 0.9 |
| Screw speed | rpm | 334 | 334 | 334 | 334 | 334 | 334 | 334 |
| Temperature Zone 1 | deg C. | 171 | 171 | 171 | 171 | 171 | 171 | 171 |
| Temperature Zone 2 | deg C. | 177 | 177 | 177 | 177 | 177 | 177 | 177 |
| Temperature Zone 3 | deg C. | 177 | 177 | 177 | 177 | 182 | 182 | 182 |
| Temperature Zone 4 | deg C. | 177 | 177 | 177 | 182 | 182 | 182 | 182 |
| Temperature Die | deg C. | 188 | 188 | 188 | 188 | 188 | 188 | 188 |
| Melt temperature | deg C. | 196 | 195 | 197 | 197 | 197 | 193 | 197 |
| Pressure Vent 1 | kPa | 86.1 | 80.1 | 78.4 | 78.8 | 76.1 | 71.1 | 71.6 |
| Pressure Vent 2 | kPa | 84.1 | 79.5 | 77.5 | 77.7 | 75.7 | 71.2 | 71.7 |
| Pressure Vent 3 | kPa | 46.3 | 47.3 | 46.0 | 46.9 | 47.2 | 46.5 | 46.8 |
| Pressure Vent 4 | kPa | 33.3 | 32.7 | 33.2 | 33.2 | 32.9 | 33.3 | 33.2 |
| Residual Toluene | wt % | 1.86 | 1.6 | 1.61 | 1.44 | 1.65 | 1.66 | 1.42 |

TABLE 4

| Analysis | Notes | Units | Before Isolation | Ex. 4 | Ex. 12 |
|---|---|---|---|---|---|
| IV | | dl/g | 0.0789 | 0.0774 | 0.0811 |
| % Toluene | GC | % | | 0.4695 | 1.4208 |
| Hydroxyl content | FTIR | ppm | 20737 | 21002 | 21091 |
| Residual 2,6-X | GC | ppm | 176 | 186 | 216 |
| Residual TMBPA | GC | ppm | 17235 | 15971 | 16167 |
| $M_n$ | GPC | AMU | 1250 | 1248 | 1213 |
| $M_w$ | GPC | AMU | 2528 | 2638 | 2583 |
| D ($M_w/M_n$) | GPC | | 2.02 | 2.11 | 2.13 |
| $^1$H NMR | Absolute $M_n$ | | 1489 | 1514 | 1474 |
| | Wt % Biphenyl unit | | 0.67 | 0.64 | 0.66 |
| | Wt % total TMBPA | | 21.12 | 20.78 | 21.07 |
| | Wt % Free TMBPA | | 1.17 | 1.04 | 1.12 |
| | Wt % Ex Mannich DBA | | 0.86 | 1.48 | 1.51 |
| | Functionality | | 1.88 | 1.91 | 1.88 |
| | ppm OH | ppm | 22700 | 23300 | 23700 |
| | % Terminal TMBPA | % | 48 | 48 | 49 |

EXAMPLE 13

A monofunctional poly(arylene ether) ether having an intrinsic viscosity of about 0.12 deciliter per gram at 25° C. was prepared by oxidative polymerization of 2,6-dimethylphenol. After chelation of the catalyst, the solution was concentrated to 59% solids and isolated by devolatilizing extrusion using the apparatus described for Examples 1-12 and the processing conditions detailed in Table 5. Note that the extrusion temperatures were higher and the last vent pressure was lower than those for Examples 1-12.

TABLE 5

| Variable | Unit | Ex. 13 |
|---|---|---|
| Toluene-PPE solution % solids | % | 59 |
| Toluene-PPE solution feed rate | kg/hr | 13.6 |
| Dry back feed rate | kg/hr | 0.9 |
| Screw speed | rpm | 400 |
| Temperature Zone 1 | deg C. | 204 |
| Temperature Zone 2 | deg C. | 204 |
| Temperature Zone 3 | deg C. | 204 |
| Temperature Zone 4 | deg C. | 204 |
| Temperature Die | deg C. | 246 |
| Melt temperature | deg C. | 253 |
| Pressure Vent 1 | kPa | 86.1 |
| Pressure Vent 2 | kPa | 81.7 |
| Pressure Vent 3 | kPa | 9.6 |
| Pressure Vent 4 | kPa | 6.8 |
| Residual Toluene | wt % | .26 |

COMPARATIVE EXAMPLES 1-5

These examples illustrate melt extrusion of a methacrylate-capped poly(arylene ether) dry powder Two batches of a bifunctional poly(arylene ether) having an intrinsic viscosity of 0.09 dL/g measured at 25° C. in chloroform were prepared by oxidative copolymerization of 2,6-dimethylphenol and 2,2-bis(3,5-dimethyl-4-hydroxyphenyl)propane in toluene. The terminal hydroxy groups of the bifunctional poly(arylene ether) were methacrylate-capped by reaction with methacrylic anhydride in the presence of N,N-dimethylaminopyridine (DMAP) as capping catalyst to yield two batches of a methacrylate-capped bifunctional poly(arylene ether) having an intrinsic viscosity of 0.09 dL/g measured at 25° C. in chloroform. A byproduct of the capping reaction is methacrylic acid, which is present in the post-capping solution, along with excess methacrylic anhydride and DMAP. Methacrylic acid and methacrylic anhydride present a potential complication in the devolatilizing extrusion process in that they may polymerize exothermically under the extruder processing conditions. A corresponding polymerization reaction may, in principle, occur with the methacrylate capping groups present in the functionalized polymer, and the resulting crosslinking of the methacrylate-capped bifunctional poly(arylene ether) could dramatically increase the melt viscosity within the extruder.

In order to clarify the extent of the cross-linking hazard, thermal stability tests were carried out by conducting laboratory-scale melt extrusion of dry capped polymer.

Laboratory-scale melt extrusion experiments demonstrated the molecular weight stability of a methacrylate dicapped poly(arylene ether) after multiple passes through a laboratory extruder. The starting material for these experiments was a solid methacrylate dicapped poly(arylene ether) having an intrinsic viscosity of 0.09 dL/g. It had previously been isolated by a precipitation procedure comprising addition of a 45 weight percent solution of the methacrylate dicapped poly(arylene ether) in methanol. The extruder was a C. W. Brabender extruder, type 2503, single screw, 1.9 centimeter (¾ inch) screw diameter, with a ratio of screw length to diameter of 25. The extruder was operated at 100 rotations per minute with the four zone temperatures specified in Table 7. The extruded polymer was analyzed by gel permeation chromatography to determine molecular weight characteristics, and by $^1$H NMR to determine the weight concentration of methacrylate groups, based on the weight of the polymer. The results in Table 6 show the stability of the methacrylate capping groups on the polymer after multiple lab extrusions. The data indicate that the reactivity of the material at the extrusion melt temperature (about 230° C.) is low: all the samples passed through the lab extruder up to three times without incident; some gel particles were detected in solution but they were insignificantly small; number average molecular weight increased by about 5%; weight average molecular weight increased by about 15%; and the weight percent of methacrylate capping groups decreased by about 4%. Although the reactivity of the material at the extrusion temperature is low, a small but significant amount of branching and/or crosslinking did occur, as evidenced by the molecular weight increase.

TABLE 6

| Sample | Pass # | Zone 1 Temp. (° C.) | Zone 2 Temp. (° C.) | Zone 3 Temp. (° C.) | Die Temp. (° C.) | Melt Temp. (° C.) | Screw Rot. Rate (rpm) | Amps | $M_n$ | $M_w$ | D | MA-Cap (wt %) |
|---|---|---|---|---|---|---|---|---|---|---|---|---|
| C. Ex. 1 | 0 | — | — | — | — | — | — | — | 2755 | 4393 | 1.59 | 6.83 |
| C. Ex. 2 | 1 | 204 | 218 | 218 | 227 | 234 | 100 | 3 | 2838 | 4743 | 1.67 | 6.74 |
| C. Ex. 3 | 3 | 204 | 218 | 218 | 227 | 233 | 100 | 3.5 | 2891 | 5054 | 1.75 | 6.58 |
| C. Ex. 4 | 1 | 254 | 268 | 268 | 277 | 269 | 100 | 2 | 2971 | 5553 | 1.87 | 6.50 |
| C. Ex. 5 | 3 | 254 | 268 | 268 | 277 | 279 | 100 | 2.5 | 3166 | 6649 | 2.10 | 6.19 |

EXAMPLES 14-16, COMPARATIVE EXAMPLES 6 and 7

A poly(arylene ether) solution was processed by devolatilizing extrusion using the three sets of conditions detailed in Table 7. "Product discharge temp." is the temperature of the poly(arylene ether) at the end of the cooling belt as measured by a hand-held infrared temperature detector (Cole Parmer 39650-02 IR thermometer). The solution was prepared by re-dissolving precipitated methacrylate dicapped poly(arylene ether) (0.09 dL/g) powder in toluene to give a solution comprising 30 weight percent solids, then concentrating the solution to 70 weight percent solids. The three sets of devolatilizing extrusion conditions correspond to Examples 14-16 in Table 7.

Results of characterizing the isolated capped poly(arylene ether)s are provided in Table 8. Residual (uncapped) hydroxy groups were determined by Fourier Transform Infrared spectroscopy (FTIR) using 2,6-dimethylphenol standards. Concentrations of free methacrylic acid (MAOH), methacrylic anhydride (MAA), DMAP, and toluene were determined by gas chromatography. Number average molecular weight (MO, weight average molecular weight ($M_n$), and polydispersity index (D; $M_w/M_n$) were determined by gel permeation chromatography. The weight percent of methacrylate capping groups (based on the total weight of the capped poly(arylene ether)) was determined by proton nuclear magnetic resonance spectroscopy ($^1$H NMR). In Table 8, Comparative Examples 6 and 7 represent the two precipitated methacrylate dicapped poly(arylene ether) (0.09 dL/g) powders used to generate the poly(arylene ether) solutions for Examples 14-16.

The results in Table 8 show that the process of devolatilizing extrusion and melt cooling in air by means of a cooling belt unexpectedly does not result in substantial decomposition of the capped poly(arylene ether). This result is unexpected because molecular mobility is greater in solution than in a polymer melt, and because air oxidation of the methacrylate groups might be expected to initiate polymerization of those groups. In particular, although crosslinking of the methacrylate functionality would have been expected to occur under these conditions, no significant difference in methacrylate functionality or molecular weight was observed for the product before and after undergoing the devolatilizing extrusion and belt cooler collection process. These results demonstrate the surprising result that the methacrylate-capped poly(arylene ether) is able to withstand the total isolation process without significant cross-linking or degradation due to oxidation by air. The product may be isolated by this process without the need to add a polymerization stabilizer.

TABLE 7

| Parameter | units | Ex. 14 | Ex. 15 | Ex. 16 |
|---|---|---|---|---|
| Temperature Zone 1 | ° C. | 188 | 188 | 188 |
| Temperature Zone 2 | ° C. | 188 | 188 | 188 |
| Temperature Zone 3 | ° C. | 191 | 191 | 188 |
| Temperature Zone 4 | ° C. | 194 | 198 | 204 |
| Die Temp | ° C. | 204 | 210 | 216 |
| Melt Temp | ° C. | 223 | 225 | 229 |
| Vacuum Port #1 | kPa | 90.4 | 90.8 | 90.4 |
| Vacuum Port #2 | kPa | 90.3 | 91.1 | 90.8 |
| Vacuum Port #3 | kPa | 41.5 | 37.3 | 41.0 |
| Vacuum Port #4 | kPa | 26.7 | 27.0 | 26.7 |
| Extruder screw rotation rate | rpm | 330 | 44.0 | 44.0 |
| Extruder Torque | % | 40 | 41 | 37 |
| Polymer Solution Feed | kg/hr | 11.4 | 13.6 | 13.6 |
| Barrel #1 Feed | lb/hr | 0.9 | 0.9 | 0.9 |
| Belt Cooler Temp | ° C. | — | 27 | — |
| Product discharge temp | ° C. | — | 93 | — |

TABLE 8

| | Method | Unit | C. Ex. 6 | C. Ex. 7 | Ex. 14 | Ex. 15 | Ex. 16 |
|---|---|---|---|---|---|---|---|
| OH | FTIR | ppm | 12.2 | 187 | 105 | 102 | 105 |
| MAOH | GC | ppm | 1857 | 3705 | 705 | 869 | 853 |
| MAA | GC | ppm | 1809 | 2353 | 268 | 307 | 311 |
| DMAP | GC | ppm | 1241 | 780 | 447 | 735 | 591 |
| Toluene | GC | wt % | 0.13% | 0.65% | 0.63% | 0.73% | 0.68% |
| $M_n$ | GPC | AMU | 2739 | 2634 | 2748 | 2697 | 2748 |
| $M_w$ | GPC | AMU | 4210 | 4156 | 4598 | 4516 | 4606 |
| D ($M_w/M_n$) | GPC | | 1.54 | 1.58 | 1.67 | 1.67 | 1.68 |
| MA-Cap | $^1$H NMR | wt % | 6.83 | — | 6.99 | 6.91 | 6.99 |

COMPARATIVE EXAMPLES 8-46

These comparative examples illustrate the effects of melt extrusion on the molecular weight of various methacrylate-capped poly(arylene ether)s in the presence and absence of the polymerization inhibitor 4-t-butylcatechol.

The experiments were conducted on the laboratory-scale extruder described above for Comparative Examples 1-5. In Table 9, the column labeled "PPE type" indicates the type of poly(arylene ether) used. The designation "MAPPE 0.12" corresponds to a methacrylate-capped poly(2,6-dimethyl-1,4-phenylene ether) (prepared by homopolymerization of 2,6-dimethylphenol followed by capped with methacrylic anhydride) having an intrinsic viscosity of 0.12 deciliter per gram; "MA2PPE 0.06" corresponds to a methacrylate-dicapped copolymer of 2,6-dimethylphenol and tetramethylbisphenol A having an intrinsic viscosity of 0.06 deciliter per gram; "MA2PPE 0.09" corresponds to a methacrylate-dicapped copolymer of 2,6-dimethylphenol and tetramethylbisphenol A having an intrinsic viscosity of 0.09 deciliter per gram. All poly(arylene ether)s were previously isolated from solution by precipitation in methanol. The column labeled "PPE amount" gives the amount of the poly(arylene ether) in grams. The numbers in the column labeled "Inhib." correspond to the amount of 4-t-butylcatechol in grams.

In Table 9, temperatures of the four temperature-controlled extruder zones are expressed in degrees centigrade. The temperatures in the columns labeled "Probe(1)" and "Probe(2)" are expressed in degrees centigrade and correspond to melt temperatures within the extruder. The column labeled "Time (sec)" gives the residence time in the extruder, expressed in units of seconds. The column labeled "RPM" gives the extruder screw rotation rate, in rotations per minute. When an example lists values of "NA" in columns for extruder temperature, time, and rotation rate, it means that the sample was analyzed without extrusion.

The results show that each of the methacrylate-capped poly(arylene ether)s exhibited a small but significant increase in molecular weight on melt extrusion. In general, the molecular weight increase was greater for the mono-capped 0.12 dL/g poly(arylene ether) than for the dicapped 0.06 dL/g poly(arylene ether). Neither of these resins generated any observable gels after one pass through the extruder. The addition of the polymerization inhibitor 4-t-butylcatechol allows for an increase in die temperature, but increasing the concentration of 4-t-butylcatechol from 0.25 to 0.5 parts by weight per 100 parts by weight poly(arylene ether) did not produce an additional benefit.

For the dicapped 0.09 dL/g poly(arylene ether), the effect of multiple passes through the extruder was explored. In general, some molecular weight build was observed on the first pass through the extruder, and further molecular weight build was observed after second and third passes through the extruder. Some gels were observed after the second pass through the extruder.

The molecular weight increases observed on melt extrusion of these poly(arylene ether)s highlight the unexpected ability to isolate such resins by devolatilizing extrusion under similar temperature conditions without observing a significant molecular weight increase.

TABLE 9

| | PPE | PPE (g) | Inhibitor (g) | Temp-1 (C.) | Temp-2 (C.) | Temp-3 (C.) | Temp-4 (C.) | Probe (1) | Probe (2) | Time (s) | RPM | $M_w$ (AMU) | $M_n$ (AMU) | D | Pass |
|---|---|---|---|---|---|---|---|---|---|---|---|---|---|---|---|
| C. Ex. 8 | MAPPE 0.12 | NA | 0 | NA | NA | NA | NA | — | — | NA | NA | 7298 | 4667 | 1.6 | — |
| C. Ex. 9 | MAPPE 0.12 | 200 | 0 | 257 | 276 | 283 | 257 | — | — | 45 | 100 | 7593 | 4810 | 1.6 | 1 |
| C. Ex. 10 | MAPPE 0.12 | 200 | 0 | 237 | 256 | 263 | 237 | — | — | 45 | 100 | 7561 | 4789 | 1.6 | 1 |
| C. Ex. 11 | MAPPE 0.12 | 200 | 0 | 227 | 246 | 253 | 227 | — | — | 45 | 100 | 7535 | 4752 | 1.6 | 1 |
| C. Ex. 12 | MAPPE 0.12 | 200 | 0 | 217 | 236 | 243 | 217 | — | — | 45 | 100 | 7457 | 4742 | 1.6 | 1 |
| C. Ex. 13 | MAPPE 0.12 | 200 | 0 | 207 | 226 | 233 | 207 | — | — | 45 | 100 | 7442 | 4729 | 1.6 | 1 |
| C. Ex. 14 | MAPPE 0.12 | 200 | 0 | 204 | 218 | 218 | 232 | — | — | 45 | 100 | 7408 | 4718 | 1.6 | 1 |
| C. Ex. 15 | MAPPE 0.12 | 200 | 0.05 | 204 | 218 | 218 | 232 | — | — | 45 | 100 | 7388 | 4714 | 1.6 | 1 |
| C. Ex. 16 | MAPPE 0.12 | 200 | 0.10 | 204 | 218 | 218 | 232 | — | — | 45 | 100 | 7538 | 4712 | 1.6 | 1 |
| C. Ex. 17 | MAPPE 0.12 | 200 | 0.15 | 204 | 218 | 218 | 232 | — | — | 45 | 100 | 7488 | 4716 | 1.6 | 1 |
| C. Ex. 18 | MAPPE 0.12 | 200 | 0.20 | 204 | 218 | 218 | 232 | — | — | 45 | 100 | 7399 | 4704 | 1.6 | 1 |
| C. Ex. 19 | MAPPE 0.12 | 200 | 0.25 | 204 | 218 | 218 | 232 | — | — | 45 | 100 | 7384 | 4707 | 1.6 | 1 |
| C. Ex. 20 | MAPPE 0.12 | 200 | 0.50 | 204 | 218 | 218 | 232 | — | — | 45 | 100 | 7376 | 4696 | 1.6 | 1 |
| C. Ex. 21 | MAPPE 0.12 | 200 | 0.75 | 204 | 218 | 218 | 232 | — | — | 45 | 100 | 7345 | 4726 | 1.6 | 1 |
| C. Ex. 22 | MAPPE 0.12 | 200 | 1.00 | 204 | 218 | 218 | 232 | — | — | 45 | 100 | 7330 | 2733 | 1.6 | 1 |
| C. Ex. 23 | MAPPE 0.12 | 200 | 0.50 | 227 | 246 | 253 | 227 | — | — | 45 | 100 | 7442 | 4729 | 1.6 | 1 |
| C. Ex. 24 | MA2PPE 0.06 | NA | 0 | NA | NA | NA | NA | — | — | NA | NA | 3227 | 2438 | 1.3 | NA |
| C. Ex. 25 | MA2PPE 0.06 | 200 | 1.00 | 204 | 218 | 218 | 232 | — | — | 45 | 100 | 3360 | 2493 | 1.3 | 1 |
| C. Ex. 26 | MA2PPE 0.06 | 200 | 0 | 204 | 218 | 218 | 232 | — | — | 45 | 100 | 3362 | 2494 | 1.3 | 1 |
| C. Ex. 27 | MA2PPE 0.06 | 200 | 0 | 116 | 208 | 208 | 222 | — | — | 45 | 100 | 3556 | 2556 | 1.4 | 1 |
| C. Ex. 28 | MA2PPE 0.06 | 200 | 0 | 186 | 198 | 198 | 212 | — | — | 45 | 100 | 3660 | 2580 | 1.4 | 1 |
| C. Ex. 29 | MA2PPE 0.06 | 200 | 0 | 176 | 188 | 188 | 204 | — | — | 45 | 100 | 3339 | 2486 | 1.3 | 1 |
| C. Ex. 30 | MA2PPE 0.06 | 200 | 0 | 167 | 178 | 178 | 192 | — | — | 45 | 100 | 3397 | 2471 | 1.3 | 1 |
| C. Ex. 31 | MA2PPE 0.06 | 200 | 0 | 157 | 168 | 168 | 186 | — | — | 45 | 100 | 3300 | 2474 | 1.3 | 1 |
| C. Ex. 32 | MA2PPE 0.06 | 200 | 0 | 146 | 156 | 156 | 172 | — | — | 45 | 100 | 3275 | 2463 | 1.3 | 1 |
| C. Ex. 33 | MA2PPE 0.09 | — | 0 | — | — | — | — | — | — | — | — | 4167 | 2944 | 1.42 | — |
| C. Ex. 34 | MA2PPE 0.09 | 200 | 0.5 | 274 | 288 | 288 | 302 | 302 | 296 | 45 | 100 | 5255 | 3227 | 1.6 | 1 |
| C. Ex. 35 | MA2PPE 0.09 | 200 | 0.5 | 274 | 288 | 288 | 302 | 302 | 296 | 45 | 100 | 5493 | 3305 | 1.7 | 2 |
| C. Ex. 36 | MA2PPE 0.09 | 200 | 0.5 | 254 | 268 | 268 | 277 | 277 | 275 | 45 | 100 | 4588 | 3087 | 1.5 | 1 |
| C. Ex. 37 | MA2PPE 0.09 | 200 | 0.5 | 254 | 268 | 268 | 277 | 277 | 275 | 45 | 100 | 4698 | 3121 | 1.5 | 2 |
| C. Ex. 38 | MA2PPE 0.09 | 200 | 0.5 | 224 | 238 | 238 | 248 | 252 | 249 | 45 | 100 | 4259 | 2981 | 1.5 | 1 |
| C. Ex. 39 | MA2PPE 0.09 | 200 | 0.5 | 224 | 238 | 238 | 248 | 252 | 249 | 45 | 100 | 4455 | 3052 | 1.5 | 2 |
| C. Ex. 40 | MA2PPE 0.09 | 200 | 1 | 274 | 288 | 288 | 302 | 312 | 307 | 45 | 100 | 4961 | 3171 | 1.6 | 1 |
| C. Ex. 41 | MA2PPE 0.09 | 200 | 1 | 274 | 288 | 288 | 302 | 312 | 307 | 45 | 100 | 5176 | 3226 | 1.6 | 2 |
| C. Ex. 42 | MA2PPE 0.09 | 200 | 1 | 254 | 268 | 268 | 277 | 278 | 274 | 45 | 100 | 4599 | 3094 | 1.5 | 1 |
| C. Ex. 43 | MA2PPE 0.09 | 200 | 1 | 254 | 268 | 268 | 277 | 278 | 274 | 45 | 100 | 4780 | 3144 | 1.5 | 2 |
| C. Ex. 44 | MA2PPE 0.09 | 200 | 1 | 224 | 238 | 238 | 248 | 253 | 251 | 45 | 100 | 4341 | 3016 | 1.4 | 1 |
| C. Ex. 45 | MA2PPE 0.09 | 200 | 1 | 224 | 238 | 238 | 248 | 253 | 251 | 45 | 100 | 4438 | 3040 | 1.5 | 2 |
| C. Ex. 46 | MA2PPE 0.09 | 200 | 0 | NA | NA | NA | NA | NA | NA | 45 | 100 | 4393 | 2355 | 1.8 | 1 |

EXAMPLES 17 and 18, COMPARATIVE EXAMPLE 47

These examples illustrate the molecular weight distribution of two poly(arylene ether)s isolated by the devolatilizing extrusion process. They also allow a comparison to one of the same poly(arylene ether)s isolated by precipitation.

The poly(arylene ether) of Example 17 in Table 10 was a poly(2,6-dimethyl-1,4-phenylene ether) having an intrinsic viscosity of 0.12 deciliter per gram obtained as PPO SA120 from GE Plastics. The poly(arylene ether) of Example 18 and Comparative Example 47 was a poly(2,6-dimethyl-1,4-phenylene ether) having an intrinsic viscosity of 0.09 deciliter per gram obtained as PPO SA90 from GE Plastics. For all of these examples, the experiment started with a 50 weight percent solution of the poly(arylene ether) in toluene. For Examples 17 and 18, the poly(arylene ether)s were isolated by the devolatilizing extrusion process described above for Examples 1-12. For Comparative Example 47, the poly(arylene ether) was precipitated by addition of one part by volume of the toluene solution to three parts by volume of methanol. Molecular weight distribution was determined by gel permeation chromatography using polystyrene standards as described above. A comparison of the results for Example 18 and Comparative Example 47 show that the Example 18 sample isolated by devolatilizing extrusion had a higher fraction of low molecular weight species than the Comparative Example 47 sample isolated by precipitation. For example, greater than 5 weight percent of the Example 18 sample had a molecular weight less than 500 atomic mass units, and greater than 10 weight percent of the sample had a molecular weight between 500 and 1500 atomic mass units.

TABLE 10

| | Ex. 17 | Ex. 18 | C. Ex. 47 |
|---|---|---|---|
| | | PPE type | |
| Isolation method | PPE 0.12 devol. extrusion | PPE 0.09 devol. extrusion | PPE 0.09 precipitation |
| Mn | 3310 | 2064 | 2580 |
| Mw | 7250 | 4024 | 4650 |
| D | 2.19 | 1.95 | 1.80 |
| % <= 500 | 1.56 | 3.10 | 1.72 |
| % <= 750 | 2.90 | 5.97 | 3.45 |
| % <= 1000 | 4.48 | 9.46 | 5.72 |
| % <= 1250 | 6.25 | 13.29 | 8.30 |
| % <= 1500 | 8.15 | 17.50 | 11.47 |
| % <= 1750 | 10.25 | 22.05 | 14.98 |
| % <= 2000 | 12.51 | 26.82 | 18.84 |

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of isolating a poly(arylene ether), comprising:
   removing volatiles from mixture comprising a poly(arylene ether) and a solvent by devolatilizing extrusion to form an extruded poly(arylene ether); wherein the devolatilizing extrusion comprises adding a solid poly(arylene ether) to a first section of an extruder, and adding the mixture to a second section of the extruder downstream of the first section; and
   cooling the extruded poly(arylene ether) with a cooling belt to form an isolated poly(arylene ether);
   wherein the isolated poly(arylene ether) and the solid poly(arylene ether) are the same and are a poly(arylene ether) comprising, on average, at least 1.5 capping groups per molecule;
   wherein the isolated poly(arylene ether) has an intrinsic viscosity of about 0.04 to about 0.15 deciliter per gram as measured in chloroform at 25° C.;
   wherein the mixture comprises about 65 to about 85 weight percent poly(arylene ether) and about 15 to about 35 weight percent solvent; and
   wherein devolatilizing extrusion comprises feeding the mixture to an extruder comprising
      at least one barrel having a temperature of about 200 to about 235° C., and
      at least one vent having a pressure of about 20 to about 40 kilopascals.

2. The method of claim 1, wherein the isolated poly(arylene ether) comprises a poly(arylene ether) having the structure

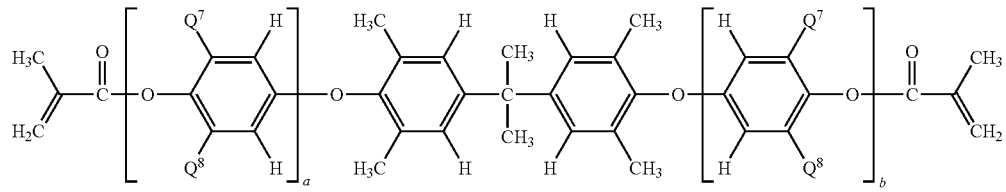

wherein each occurrence of $Q^7$ and $Q^8$ is independently methyl or di-n-butylaminomethyl; and each occurrence of a and b is independently 0 to about 12, provided that the sum of a and b is at least 1.

3. The method of claim 1, wherein the solid poly(arylene ether) is a portion of the isolated poly(arylene ether).

4. A method of isolating a poly(arylene ether), comprising:
   removing volatiles from a mixture comprising a poly(arylene ether) and a solvent by devolatilizing extrusion to form an extruded poly(arylene ether); wherein the devolatilizing extrusion comprises adding a solid poly(arylene ether) to a first section of an extruder, and adding the mixture to a second section of the extruder downstream of the first section; and
   cooling the extruded poly(arylene ether) with a cooling belt to form an isolated poly(arylene ether);
   wherein the mixture comprises about 70 to about 80 weight percent poly(arylene ether) and about 20 to about 30 weight percent toluene; and
   wherein the isolated poly(arylene ether) has an intrinsic viscosity of about 0.04 to about 0.10 deciliter per gram as measured in chloroform at 25° C.;
   wherein the isolated poly(arylene ether) and the soild poly(arylene ether) are the same and have, on average, at least 1.5 capping groups per molecule;
   wherein the isolated poly(arylene ether) comprises a poly(arylene ether) having the structure

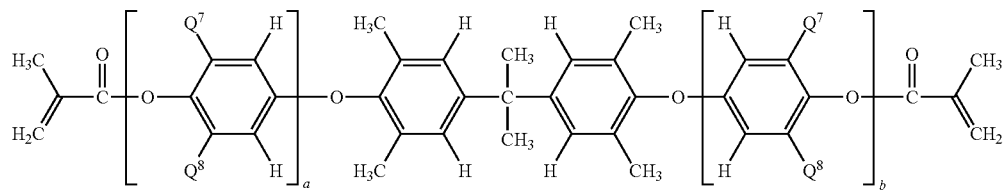

wherein each occurrence of $Q^7$ and $Q^8$ is independently methyl or di-n-butylaminomethyl; and each occurrence of a and b is independently 0 to about 12, provided that the sum of a and b is at least 1;
   wherein devolatilizing extrusion comprises feeding the mixture to an extruder comprising
      at least one barrel having a temperature of about 210 to about 230° C., and at least one vent having a pressure of about 25 to about 35 kilopascals;
wherein the mixture is fed to the extruder downstream of at least one vent; and wherein a portion of the isolated poly(arylene ether) is recycled for addition to the feed throat of the extruder.

* * * * *